United States Patent
Koga et al.

(10) Patent No.: US 7,140,697 B2
(45) Date of Patent: Nov. 28, 2006

(54) ELECTRIC PARKING BRAKE APPARATUS

(75) Inventors: Keiichi Koga, Toyota (JP); Yoshikazu Tachiiri, Chiryu (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/720,180

(22) Filed: Nov. 25, 2003

(65) Prior Publication Data
US 2004/0113486 A1    Jun. 17, 2004

(30) Foreign Application Priority Data
Nov. 27, 2002    (JP)    ............... 2002-343203

(51) Int. Cl.
B60T 13/66    (2006.01)

(52) U.S. Cl. .............. 303/20; 188/156; 188/162; 188/20; 192/219.4

(58) Field of Classification Search ........... 303/20, 303/3, 5, 191; 188/160 P, 160 A, 160 R, 188/106 F, 156, 158, 157, 162, 20, 171; 192/219.4
See application file for complete search history.

(56) References Cited

U.S. PATENT DOCUMENTS

| | | | |
|---|---|---|---|
| 4,629,043 A * | 12/1986 | Matsuo et al. | 477/184 |
| 5,251,968 A * | 10/1993 | Rath | 303/9.62 |
| 6,019,436 A | 2/2000 | Siepker | |
| 6,086,515 A | 7/2000 | Buschmann et al. | |
| 6,209,689 B1 * | 4/2001 | Bohm | 188/156 |
| 6,260,934 B1 * | 7/2001 | Lee | 303/192 |
| 6,321,884 B1 | 11/2001 | Balz | |
| 6,631,796 B1 * | 10/2003 | Yanaka et al. | 192/219.4 |
| 6,662,909 B1 * | 12/2003 | Taniguchi | 188/162 |
| 6,738,703 B1 * | 5/2004 | Ewinger et al. | 701/70 |
| 6,860,570 B1 * | 3/2005 | Yanaka et al. | 303/20 |

FOREIGN PATENT DOCUMENTS

DE    100 21 601 A1    11/2001

(Continued)

OTHER PUBLICATIONS

Translation of Japanese Official Action dated Dec. 6, 2005.

(Continued)

*Primary Examiner*—James McClellan
*Assistant Examiner*—Mariano Sy
(74) *Attorney, Agent, or Firm*—Buchanan Ingersoll & Rooney PC

(57) ABSTRACT

When a driver operates an activation switch, an electric parking brake apparatus performs a parking brake activation control in order to operate an electric motor until the tension of a base wire reaches a predetermined target tension to thereby bring parking brakes into an activated state. After that, the apparatus again performs the parking brake activation control when a re-activation time, which is set in accordance with the difference between an estimated temperature of a service brake and an ambient temperature, has elapsed; when the position of a shift lever has been changed; when the height of the vehicle has changed by an amount greater than a predetermined amount; or when the driver releases a brake pedal which has been continuously operated after completion of the parking brake activation control.

4 Claims, 14 Drawing Sheets

FOREIGN PATENT DOCUMENTS

| | | |
|---|---|---|
| DE | 100 61 064 A1 | 6/2002 |
| DE | 101 04 498 A1 | 8/2002 |
| EP | 1 080 980 A2 | 7/2000 |
| EP | 1 083 360 A2 | 9/2000 |
| JP | 61-287846 | 12/1986 |
| JP | 6 137415 | 5/1994 |
| JP | 8-48219 | 2/1996 |
| JP | 8-301083 | 11/1996 |
| JP | 10-76931 | 3/1998 |
| JP | 2000-127927 | 5/2000 |
| JP | 2000-185647 | 7/2000 |
| JP | 2001-106047 A | 4/2001 |
| JP | 2002-225701 | 8/2002 |
| WO | WO 90/15743 A2 | 12/1990 |
| WO | WO 03/043864 A1 | 5/2003 |

OTHER PUBLICATIONS

European Official Action dated May 5, 2006.

* cited by examiner

ELECTRIC PARKING BRAKE APPARATUS

BACKGROUND OF THE INVENTION

1. Field of the Invention

The present invention relates to an electric parking brake apparatus capable of operating a parking brake of a vehicle by use of electric drive means such as an electric motor.

2. Description of Related Art

Japanese Patent Application Laid-Open (kokai) No. 2002-225701 discloses a conventional electric parking brake apparatus of such a type. The disclosed apparatus includes a parking brake, which consists of a brake disk and a brake pad for generating a braking force corresponding to a pressure-contact force at the time of pressure contact with the brake disk; and an electric motor for driving the brake pad. Parking brake activation control is performed in such a manner that the motor is operated until current flowing through the motor and increasing with the pressure contact force reaches a predetermined target value, so as to bring the parking brake into an activated state in which the parking brake can stop the vehicle and maintain it in the stopped state, and subsequently, the operation of the motor is stopped.

Further, in the disclosed apparatus, between the motor and the parking brake is disposed a speed reduction mechanism including a plurality of gears and adapted to permit transmission of drive torque of the motor to the brake pad, while preventing transmission to the motor of a force stemming from the pressure contact force of the brake pad. Therefore, even after the operation of the motor is stopped after completion of the parking brake activation control (even after the current flowing through the motor decreases to zero), the pressure contact force can be held, whereby the vehicle can be stopped and maintained in the stopped state.

Incidentally, a parking brake as described above is typically disposed in the vicinity of a service brake of a vehicle, and therefore, heat generated at the service brake is transferred to the parking brake. Accordingly, when the temperature of the service brake becomes high as a result of repeated use of the service brake during traveling of the vehicle, the temperatures of components (brake disk, brake pads, etc.) of the parking brake also become high, with resultant thermal expansions of the components. Therefore, when the parking brake is brought into an activated state in such a condition by means of the above-described parking brake activation control and the braking force of the parking brake is held by the above-described action of the speed reduction mechanism, depending on the relation between thermal expansion coefficients of the components of the parking brake, the braking force of the parking brake may decrease as the temperatures of the components decrease with time, because of differences in thermal contraction/expansion among the components.

In order to solve such a drawback, the disclosed apparatus is configured in such a manner that even after the parking brake enters an activated state upon completion of the above-described parking brake activation control, the parking brake activation control is repeated every time a predetermined time elapses, to thereby maintain the braking force of the parking brake at a proper level.

However, the disclosed apparatus has the following problem. The temperature decrease speed of each component of the parking brake depends on the temperature difference between the temperature of the component and the ambient temperature, and increases with the temperature difference. Therefore, when the temperatures of the components of the parking brake are extremely high at the time of completion of the parking brake activation control, the temperature decrease speeds of the components after that time become high, so that the braking force of the parking brake decreases considerably before the above-described predetermined time elapses after that time. As a result, the disclosed apparatus may fail to maintain the braking force of the parking brake at a desired level through the elapse of the predetermined time.

Moreover, in the case where the braking force of the parking brake drops because of a factor other than the temperature decreases of the components of the parking brake at a certain point in time after completion of the above-described parking brake activation control, as in the above-described case, the disclosed apparatus may fail to maintain the braking force of the parking brake at a desired level through the elapse of the predetermined time.

Meanwhile, it has been known that even when the pressure contact force of the brake pad against the brake disk is constant, the braking force of the parking brake decreases when the temperatures of the components of the parking brake increase, because of a drop in friction coefficient of the friction surface of the brake pad. However, in the disclosed apparatus, a target value of current flowing through the motor (a target value of pressure contact force) used in the above-described parking brake activation control is a constant value irrespective of the temperatures of the components of the parking brake. Therefore, in the case where the temperatures of the components of the parking brake at the time of completion of the parking brake activation control are extremely high, the parking brake may fail to generate a necessary braking force even at that time. As described above, the disclosed apparatus has a problem in that after the parking brake enters an activated state upon completion of the parking brake activation control, the parking brake may fail to properly maintain a necessary braking force, depending on various stop states of the vehicle.

SUMMARY OF THE INVENTION

In view of the foregoing, an object of the present invention is to provide an electric parking brake apparatus which enables a parking brake to more properly maintain a braking force after the parking brake enters an activated state upon completion of parking brake activation control.

According to a first aspect of the present invention, there is provided an electric parking brake apparatus comprising: a parking brake including a rotation member rotating together with a wheel of a vehicle, and a friction member generating a braking force corresponding to a pressure contact force with which the friction member is pressed against the rotation member; electric drive means for driving the friction member; control means for performing parking brake activation control in order to operate the electric drive means until a pressure-contact-force-related quantity, which changes in accordance with the pressure contact force of the friction member, reaches a predetermined target pressure-contact-force-related quantity, to thereby bring the parking brake into an activated state so as to stop the vehicle and maintain the vehicle in a stopped state, and subsequently stop the operation of the electric drive means; and a force transmission blocking mechanism interposed between the electric drive means and the parking brake, the force transmission blocking mechanism permitting transmission of drive torque of the electric drive means to the friction member, but blocking transmission, to the electric drive means, of a force generated stemming from the pressure contact force of the friction member. When the magnitude of a force in a rotation direction of the rotation member that the friction member receives from the rotation member changes in a state in which the parking brake is in the activated state upon completion of the parking brake activation control, the control means again performs the parking brake activation control.

Examples of the rotation member and the friction member include, but are not limited to, a brake disk and brake pads, and a brake drum and brake shoes. Examples of the pressure-contact-force-related quantity, which changes in accordance with the pressure contact force of the friction member, include, but are not limited to, current flowing through the electric drive means and increasing with the pressure contact force of the friction member, and tension of a wire which is used in the electric drive means in order to press the friction member to the rotation member by use of tension of the wire, the tension increasing with the pressure contact force of the friction member.

In general, when a parking brake is configured to generate braking force by means of pressure contact force of a friction member in pressure contact with a rotation member, the friction member is pressed against the rotation member through mutual relative movements of a plurality of components (a plurality of links), which move in a mutually related manner upon receipt of drive torque from the electric drive means. In general, a predetermined clearance is provided at each of mechanical connection portions (joint portions) between the plurality of components in order to smooth mutual relative movements.

Accordingly, the friction member, which is originally to be disposed while being prevented from moving in the rotation direction (circumferential direction) of the rotation member, may often move over a predetermined small distance corresponding to the size of the predetermined clearance, even when the friction member is in pressure contact with the rotation member. Further, when the friction member in a state of being pressed and held against the rotation member moves in the rotation direction of the rotation member, the mechanical positional relation among the plurality of components changes in a direction in which the pressure contact force of the friction member decreases (in a configuration in which the friction member is pressed against the rotation member by use of tension of a wire, the tension of the wire structure portion decreases), with a possible drop in braking force of the parking brake. Further, the friction member in a state of being pressed and held against the rotation member moves in the rotation direction of the rotation member when the magnitude of a force in the rotation direction of the rotation member that the friction member receives from the rotation member changes.

In view of the above, the electric parking brake apparatus of the present invention is configured in such a manner that the parking brake activation control is performed again when the magnitude of a force in the rotation direction of the rotation member that the friction member receives from the rotation member changes in a state in which the parking brake is in the activated state. By virtue of the above-described configuration, when the friction member moves in the rotation direction of the rotation member as a result of a change in the magnitude of a force in the rotation direction that the friction member receives from the rotation member and the pressure contact force of the friction member decreases accordingly, the parking brake activation control is performed immediately, whereby the braking force of the parking brake can be recovered.

In other words, even in the case where the braking force of the parking brake possibly decreases as a result of movement of the friction member in the rotation direction of the rotation member at a certain time after completion of parking brake activation control, the braking force of the parking brake can be immediately recovered at the certain time, whereby the vehicle can be reliably stopped and maintained in the stopped state.

Preferably, the electric parking brake apparatus comprises service brake state determination means for determining whether a service brake of the vehicle is generating a braking force, wherein when the parking brake activation control ends in a state in which the service brake is generating a braking force and then the service brake stops generation of the braking force, the control means again performs the parking brake activation control. A determination as to whether the service brake of the vehicle is generating a braking force can be made, for example, through determination as to whether a brake pedal for the service brake is being operated by a driver; however, no limitation is imposed on the determination method.

In the case where the parking brake activation control ends in a state in which the service brake is generating a braking force (e.g., in a state in which the brake pedal for the service brake is operated) and then the service brake stops generation of the braking force (e.g., the brake pedal for the service brake is brought into an unoperated state (released); in particular, when the vehicle is stopped on an inclined road surface (which inclines in the pitching direction of the vehicle), the force in the rotation direction of the rotation member that the fiction member receives from the rotation member changes by an amount corresponding to a component of force along a direction parallel to the road surface stemming from the mass (total mass) of the vehicle, whereby the friction member may move in the rotation direction.

When the electric parking brake apparatus is configured in the above-described manner, even in the case where the parking brake activation control ends in a state in which the service brake is generating a braking force and then the service brake stops generation of the braking force at a certain time, with a possible decrease in the braking force of the parking brake, the braking force of the parking brake can be immediately recovered at the certain time, whereby the vehicle can be reliably stopped and maintained in the stopped state.

Preferably, the electric parking brake apparatus comprises shift position detection means for detecting the position of a shift lever of the vehicle, wherein when the position of the shift lever is changed after completion of the parking brake activation control, the control means again performs the parking brake activation control.

When the position of the shift lever is changed after completion of the parking brake activation control, the drive torque output from a power source and acting on drive wheels of the vehicle changes, and the force in the rotation direction of the rotation member that the fiction member receives from the rotation member changes by an amount corresponding to a change in the magnitude of the drive torque acting on the drive wheels, whereby the friction member may move in the rotation direction.

When the electric parking brake apparatus is configured in the above-described manner, even in the case where the position of the shift lever is changed at a certain point in time after completion of the parking brake activation control, with a possible decrease in the braking force of the parking brake, the braking force of the parking brake can be immediately recovered at the certain point in time, whereby the vehicle can be reliably stopped and maintained in the stopped state.

Preferably, the electric parking brake apparatus comprises vehicle total mass detection means for detecting a change in the total mass of the vehicle, wherein when a change in the total mass of the vehicle is detected after completion of the parking brake activation control, the control means again performs the parking brake activation control. The total mass of the vehicle refers to the sum total of the mass of the vehicle itself, the total mass of objects within the vehicle, such as a driver and passengers, and loads.

A change in the total mass of the vehicle can be detected on the basis of a change in the height of the vehicle (as measured at a reference position), a change in the air pressure of a tire, a change in output of any of various sensors such as a seat sensor whose output changes depending on whether a passenger sits on a seat of the vehicle, a door sensor whose output changes depending on whether a door is closed, and a seat belt sensor whose output changes depending on whether a seat belt is fastened. However, no limitation is imposed on the method for detecting a change in the total mass of the vehicle.

When the total mass of the vehicle changes after completion of parking brake activation control because of an occupant exiting or entering the vehicle or loading or unloading of a load; in particular, when the vehicle is stopped on an inclined road surface (which inclines in the pitching direction of the vehicle), the force in the rotation direction of the rotation member that the fiction member receives from the rotation member changes by an amount corresponding to a component of force along a direction parallel to the road surface stemming from the mass of the vehicle, whereby the friction member may move in the rotation direction.

When the electric parking brake apparatus is configured in the above-described manner, even in the case where the total mass of the vehicle changes at a certain point in time after completion of parking brake activation control because of, for example, an occupant exiting or entering the vehicle, with a possible decrease in the braking force of the parking brake, the braking force of the parking brake can be immediately recovered at the certain point in time, whereby the vehicle can be reliably stopped and maintained in the stopped state.

According to a second aspect of the present invention, there is provided an electric parking brake apparatus which comprises a parking brake, electric drive means, control means, and a force transmission blocking mechanism, which are the same as those of the electric parking brake apparatus according to the first aspect of the invention, wherein the parking brake is disposed at a location in the vicinity of a service brake of the vehicle such that heat generated by the service brake is transferred to the parking brake, wherein the electric parking brake apparatus further comprises temperature acquisition means for acquiring a temperature of the service brake, and wherein when the parking brake is in the activated state upon completion of the parking brake activation control, the control means again performs the parking brake activation control again at a time corresponding to a degree of a drop in the acquired temperature of the service brake.

In this case, "a degree of a drop in the temperature of the service brake" may be, but is not limited to, the difference between the ambient temperature and the temperature of the service brake acquired at the time of completion of the parking brake activation control. Further, in this case, the temperature acquisition means is configured to acquire the temperature of the service brake by use of a heat accumulation quantity, which is a quantity of heat accumulated in the service brake stemming from braking action of the service brake, and a heat radiation quantity, which is a quantity of heat radiated from the service brake.

In the case where the parking brake is disposed at a location in the vicinity of a service brake of the vehicle such that heat generated by the service brake is transferred to the parking brake, the temperatures of components (rotation member and friction member) of the parking brake depend on the temperature of the service brake, and when the temperature of the service brake decreases, the temperatures of the components of the parking brake also decrease in a manner similar to that of the temperature of the service brake. Meanwhile as previously described, the braking force of the parking brake after completion of the parking brake activation control may decrease with the temperatures of the components of the parking brake.

In view of the above, the electric parking brake apparatus according to the second aspect is configured in the above-described manner such that the control means performs the parking brake activation control again at a time corresponding to a degree of a drop in the obtained temperature of the service brake when the parking brake is in the activated state upon completion of the parking brake activation control. Thus, the parking brake activation control can be performed again at a time corresponding to a degree of a drop in the temperatures of the components of the parking brake; i.e., at a time corresponding to a degree of a drop in the braking force of parking brake.

By virtue of the above-described configuration, when the degree of a drop in the temperature of the service brake is large (e.g., the difference between the ambient temperature and the temperature of the service brake acquired at the time of completion of the parking brake activation control is large), the time at which the parking brake activation control is again performed is advanced, whereby the vehicle can be reliably stopped and maintained in the stopped state. Meanwhile, when the degree of a drop in the temperature of the service brake is small (e.g., the difference between the ambient temperature and the temperature of the service brake acquired at the time of completion of the parking brake activation control is small), the time at which the parking brake activation control is again performed is delayed, whereby the operation frequency of the parking brake can be reduced, and the vehicle can be reliably stopped and maintained in the stopped state.

In the second aspect of the present invention, the electric parking brake apparatus may comprise temperature acquisition means for acquiring a temperature of the parking brake instead of the temperature acquisition means for acquiring a temperature of the service brake, wherein the control means again performs the parking brake activation control at a time corresponding to a degree of a drop in the acquired temperature of the parking brake, instead of again performing the parking brake activation control at a time corresponding to a degree of a drop in the acquired temperature of the service brake.

In the electric parking brake apparatus according to any one of the above-described aspects, preferably, the control means is configured in such a manner that the target pressure-contact-force-related quantity used in the parking brake activation control is set to a quantity corresponding to a value near the lower limit value of the pressure contact force necessary to stop the vehicle and maintain the vehicle in a stopped state. This configuration reduces the electric power consumed by the electric drive means during the parking brake activation control, while reliably securing the braking force of the parking brake. Further, stresses that are generated in the components of the electronic parking brake apparatus stemming from the pressure contact force can be reduced, whereby the durability of the apparatus can be enhanced and the apparatus can be reduced in size.

In the electric parking brake apparatus according to any one of the above-described aspects, preferably, the control means is configured in such a manner that the target pressure-contact-force-related quantity used in the parking brake activation control is changed in accordance with a condition under which the vehicle stops (hereinafter referred to as a "stopped condition of the vehicle"). Examples of the stopped condition include, but are not limited to, an inclination angle of the stopped vehicle in the pitching direction, the rotation speed of a power source (e.g., an engine), and the position of the shift lever.

The magnitude of a force acting on the stopped vehicle in a direction for moving the vehicle forward or backward also varies depending on the stopped condition of the vehicle, such as the above-described inclination. Accordingly, the brake force of the parking brake (i.e., the pressure contact force of the friction member) required to stop the vehicle and maintain it in the stopped state varies depending on the stopped condition of the vehicle. Therefore, if the target pressure-contact-force-related quantity used in the parking brake activation control is set to a predetermined constant value irrespective of the stopped condition of the vehicle, the constant value must be set to correspond to the maximum value of the braking force of the parking brake required to stop the vehicle and maintain it in the stopped state. As a result, depending on the stopped condition of the vehicle, the target pressure-contact-force-related quantity may be set to a value corresponding to an unnecessarily large pressure contact force.

In contrast, when the electric parking brake apparatus is configured to change the target pressure-contact-force-related quantity in accordance with a stopped condition of the vehicle, the target pressure-contact-force-related quantity can be set to a proper quantity in accordance with a stopped condition of the vehicle (e.g. a quantity corresponding to a value near the lower limit value of the pressure contact force which is required to stop the vehicle and maintain it in the stopped state and which varies depending on the stopped condition of the vehicle), whereby the electric power consumed by the electric drive means during the parking brake activation control can be reduced further, and the durability of the electric parking brake apparatus can be further enhanced.

According to a third aspect of the present invention, there is provided an electric parking brake apparatus which comprises a parking brake, electric drive means, control means, a force transmission blocking mechanism, and temperature acquisition means which are the same as those of the electric parking brake apparatus according to the second aspect of the invention, wherein the control means changes the target pressure-contact-force-related quantity in such a manner that the pressure contact force corresponding to the target pressure-contact-force-related quantity increases with the temperature of the service brake. In this case, the temperature acquisition means is configured to acquire the temperature of the service brake by use of a heat accumulation quantity, which is a quantity of heat accumulated in the service brake stemming from braking action of the service brake, and a heat radiation quantity, which is a quantity of heat radiated from the service brake. Further, the control means is preferably configured to change the target pressure-contact-force-related quantity used in the parking brake activation control, in accordance with the stopped condition of the vehicle.

As described previously, in the case where the parking brake is disposed at a location in the vicinity of a service brake of the vehicle such that heat generated by the service brake is transferred to the parking brake, when the temperature of the service brake increases, the temperatures of the components (rotation member and friction member) of the parking brake increase in a manner similar to that of the temperature of the service brake. Meanwhile, as the temperatures of the components of the parking brake increase, the friction coefficient of the friction surface of the friction member decreases as a result of fading, so that the brake force of the parking brakes decrease even when the pressure contact force of the friction member pressed against the rotation member is constant.

In view of the above, the electric parking brake apparatus is configured in the above-described manner such that the target pressure-contact-force-related quantity is changed in such a manner that the pressure contact force (target pressure contact force) corresponding to the target pressure-contact-force-related quantity increases with the temperature of the service brake. Thus, the target pressure contact force can be increased with the temperatures of the components of the parking brake. Accordingly, a drop in the braking force of the parking brake stemming from fading can be prevented, and the vehicle can be reliably stopped and maintained in the stopped state even when the temperature of the service brake is high; i.e., when the temperatures of the components of the parking brake are high.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
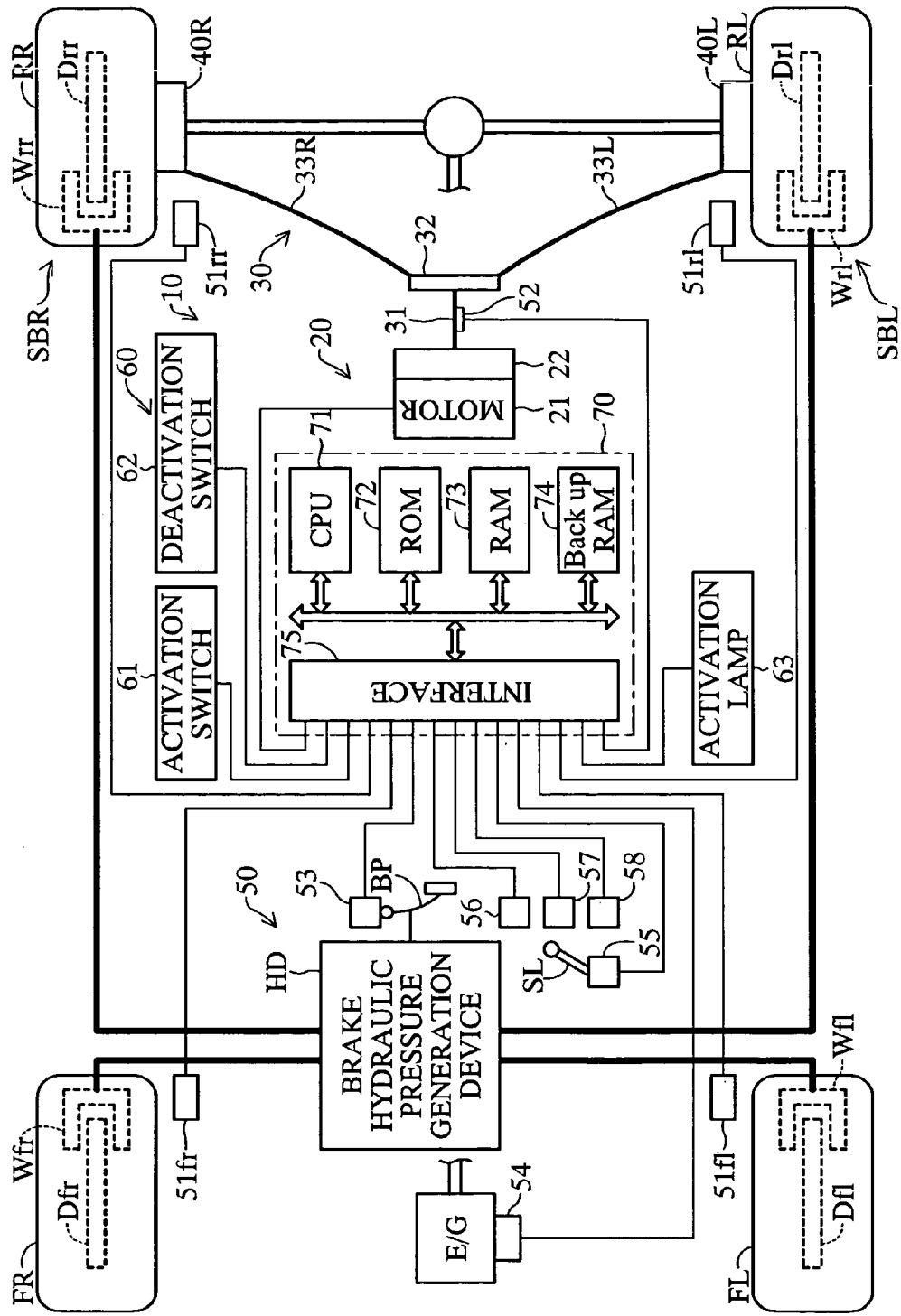
FIG. 1 is a schematic diagram of a vehicle on which is mounted an electric parking brake apparatus according to an embodiment of the present invention.

An embodiment of the present invention will now be described with reference to the drawings. FIG. 1 schematically shows the configuration of a vehicle on which is mounted an electric parking brake apparatus 10 according to the embodiment of the present invention. The vehicle is a four-wheel vehicle which has two front wheels (a front left wheel FL and a front right wheel FR) and two rear wheels (a rear left wheel RL and a rear right wheel RR).

The electric parking brake apparatus 10 includes a drive actuator section 20, a wire structure section 30, left-hand and right-hand parking brakes 40L and 40R provided adjacent to the two rear wheels, respectively, a sensor section 50, a switch-lamp system 60, and an parking brake control unit 70.

The drive actuator section 20 includes an electric motor 21, serving as electric drive means, and a speed reduction mechanism 22, serving as a force transmission blocking mechanism. The electric motor 21 can rotate in forward and reverse directions. The speed reduction mechanism 22 comprises a plurality of gear trains and is adapted to permit transmission of drive torque of the electric motor 21 to the wire structure section 30, while preventing transmission of tensile force from the wire structure section 30 to the electric motor 21.

The wire structure section 30 includes a base wire 31, a balancer 32, a left-hand wire 33L, and a right-hand wire 33R. A first end of the base wire 31 is connected to the speed reduction mechanism 22, whereas a second end of the base wire 31 is connected to a center portion of one side of the balancer 32. First ends of the left-hand and right-hand wires 33L and 33R are connected to opposite ends of the other side of the balancer 32, whereas second ends of the left-hand and right-hand wires 33L and 33R are connected to the left-hand and right-hand parking brakes 40L and 40R, respectively.

The balancer 32 appropriately inclines in the yaw direction of the vehicle in such a manner that the tension of the left-hand wire 33L and that of the right-hand wire 33R are always equal to each other irrespective of an initial difference, or a difference developed over the course of time, in length between the left-hand wire 33L and the right-hand wire 33R.

The left-hand and right-hand parking brakes 40L and 40R apply to the rear left wheel RL and the rear right wheel RR, respectively, braking forces corresponding to the tensions of the left-hand and right-hand wires 33L and 33R, respectively (i.e., corresponding to the tension of the base wire 31). Accordingly, by virtue of the above-described action of the balancer 32, the left-hand and right-hand parking brakes 40L and 40R generate the same level of braking force.

Figure 2:
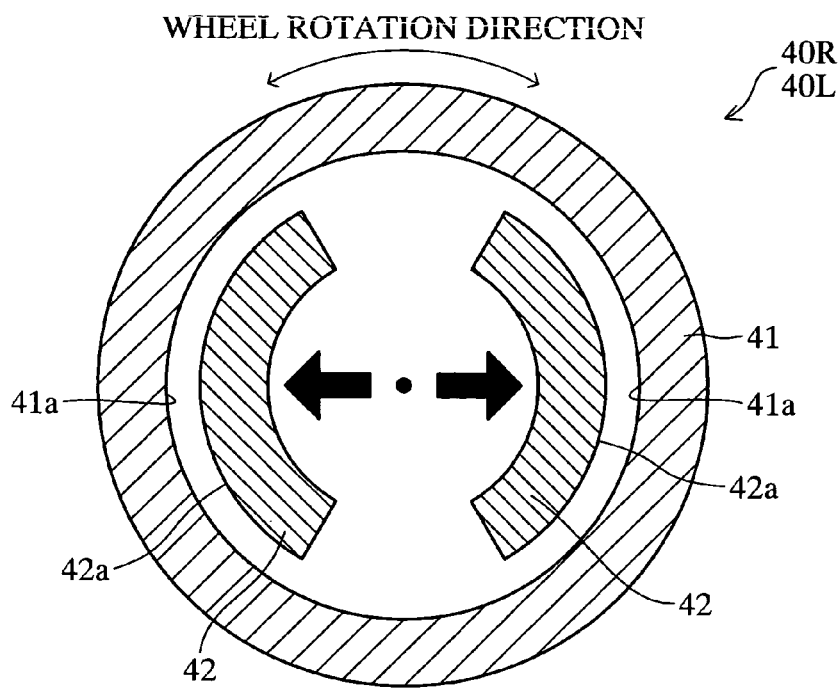
FIG. 2 is a view schematically showing the structure of a parking brake shown in FIG. 1.

FIG. 2 schematically shows the structure of one of the left-hand and right-hand parking brakes 40L and 40R. As shown in FIG. 2, the parking brake 40L or 40R includes a drum section 41, which serves as a rotation member and which rotates together with the associated rear wheel in a wheel rotation direction, and a pair of brake shoes 42, which serves as a friction member and which is disposed within the drum section 41 in such a manner that the brake shoes 42 cannot rotate in the wheel rotation direction.

The brake shoes 42 are driven within the drum section 41 toward radially outward directions (in directions for mutual separation (directions indicated by arrows in FIG. 2)) through relative movements of a plurality of unillustrated links, which move in a mutually related manner upon receipt of a tension from the wire structure section 30. Each of the brake shoes 42 has a friction surface (lining) 42a having the same curvature as that of an inner circumferential surface 41a of the drum section 41. When the friction surfaces 42a of the brake shoes 42 are pressed against the inner circumferential surface 41a of the drum section 41 in accordance with the tension from the wire structure section 30, the parking brake 40L or 40R generates a braking force.

A predetermined clearance is provided at each of connection portions between the plurality of links in order to smooth mutual relative movements. Therefore, even when the brake shoes 42 are in pressure contact with the drum section 41, the brake shoes 42 can move in the wheel rotation direction (circumferential direction) by a very small distance (predetermined minute angle) corresponding to the size of the above-described clearance. When the brake shoes 42 in a state of being pressed and held against the drum section 41 move in the wheel rotation direction, the mechanical positional relation among the plurality of links changes in a direction in which the pressure contact forces of the brake shoes 42 decrease (i.e., in a direction in which the tension of the wire structure portion 30 decreases), with a possible drop in braking force of the parking brake 40L or 40R.

Referring back to FIG. 1, by virtue of the above-described configuration, when the electric motor 21 is driven to rotate in the forward direction, the first end of the base wire 31 is pulled toward the front of the vehicle, whereby the tension exerted on the wire structure section 30 increases, with a resultant increase in the braking force generated by each of the left-hand and right-hand parking brakes 40L and 40R. In contrast, when the electric motor 21 is driven to rotate in the reverse direction, the first end of the base wire 31 is returned toward the rear of the vehicle, whereby the tension exerted on the wire structure section 30 decreases, with a resultant decrease in the braking force generated by each of the left-hand and right-hand parking brakes 40L and 40R. In a state in which the electric motor 21 is not driven, because of the above-described action of the speed reduction mechanism 22, the tension currently exerted to the wire structure section 30 is maintained, whereby the braking force generated by each of the left-hand and right-hand parking brakes 40L and 40R is maintained at the current level.

The sensor section 50 includes wheel speed sensors 51*fl*, 51*fr*, 51*rl*, and 51*rr*, a tension sensor 52, a brake pedal sensor 53, a rotation speed sensor 54, a shift position sensor 55, an inclination angle sensor 56, an ambient temperature sensor 57, and a vehicle height sensor 58. The wheel speed sensors 51*fl*, 51*fr*, 51*rl*, and 51*rr* are formed by corresponding rotary encoders which respectively output pulse signals every time the respective wheels FL, FR, RL, and RR rotate by a predetermined angle. The tension sensor 52 detects the tension Fw of the base wire 31 and outputs a signal indicating the detected tension Fw. The brake pedal sensor 53, which serves as service-brake state determination means, detects whether or not the brake pedal BP for service brakes is operated by a driver, to thereby output a signal indicating whether braking operation is currently performed, and further detects a break pedal operation force (step-on force) Fb exerted on the brake pedal BP by the driver, to thereby output a signal indicative of the break pedal operation force Fb. The rotation speed sensor 54 outputs a signal indicative of engine rotation speed Ne on the basis of the rotation speed of an unillustrated crankshaft of an engine E/G, which is a power source of the vehicle. The shift position sensor 55, which serves as shift position detection means, detects the position Pos of a shift level SL operated by the driver, and outputs a signal indicative of the position Pos of the shift lever SL. The inclination angle sensor 56 detects the inclination angle θ of the vehicle in the pitching direction, and outputs a signal indicative of the inclination angle θ. The ambient temperature sensor 57 detects the ambient temperature Ta, and outputs a signal indicative of the ambient temperature Ta. The vehicle height sensor 58 detects the height Ha (e.g., the average of heights of reference positions in the vicinity of the respective wheels), and outputs a signal indicative of the vehicle height Ha.

The shift lever SL can be moved to any one of a P (parking) position, an R (reverse) position, an N (neutral) position, a D (drive) position, a 2 (second-gear held) position, and a 1 (low-gear held) position. The shift lever SL is held (maintained) at any one of these position, unless an external force, such as driver's operation force, acts on the shift lever SL. Further, the inclination angle θ of the vehicle pitching direction obtained by the inclination angle sensor 56 assumes a positive value when the vehicle assumes a front-lowered posture with respect to the horizontal posture, and assumes a negative value when the vehicle assumes a rear-lowered posture with respect to the horizontal posture.

The switch-lamp system 60 includes an activation switch 61 to be operated manually, a deactivation switch 62 to be operated manually, and an activation lamp 63. The activation switch 61 generates a signal for activating the parking brakes 40L and 40R. The deactivation switch 62 generates a signal for deactivating the parking brakes 40L and 40R. The activation lamp 63 turns on or off depending on the state of the parking brakes 40L and 40R (whether the parking brakes 40L and 40R are in an activated state (in which the parking brakes can stop the vehicle completely and maintain the stopped state) or in a deactivated state (in which the parking brakes produce no braking force)).

The parking brake control unit 70 is a microcomputer including a CPU 71, ROM 72, RAM 73, backup RAM 74, an interface 75, etc., which are connected with one another via a bus. Routines (programs) to be executed by the CPU 71, tables (lookup tables, maps), constants, etc., are stored in the ROM 72 in advance. When necessary, the CPU 71 temporarily stores data in the RAM 73. The backup RAM 74 stores data in a state in which the power supply is on, and holds the stored data even after the power supply is shut off. The interface 75 contains AD converters.

The interface 75 is connected to the respective sensors 51 to 57, the activation switch 61, and the deactivation switch 62, in order to supply signals from the wheel speed sensor 51, etc. to the CPU 71. Further, in accordance with instructions from the CPU 71, the interface 75 feeds a drive signal to the electric motor 21, and a turn-on signal to the activation lamp 63. The above is the schematic configuration of the electric parking brake apparatus 10 of the present embodiment.

Moreover, the vehicle is provided with a brake hydraulic pressure system for service brakes. The brake hydraulic pressure system includes a brake hydraulic pressure generation device HD, which consists of a known master cylinder and a known vacuum booster and which generates a brake hydraulic pressure corresponding to the operation force Fb applied to the brake pedal BP by the driver; and wheel cylinders Wfl, Wfr, Wrl, and Wrr, which apply pressure contact force corresponding to the brake hydraulic pressure to unillustrated brake pads, to thereby press the brake pads against respective brake disks Dfl, Dfr, Drl, and Drr, which rotate together with the corresponding wheels FR, FR, RL, and RR.

Each of the brake disks Dfl, Dfr, Drl, and Drr, and corresponding brake pads constitute a service brake for the corresponding wheel. The service brake for the rear left wheel RL (i.e., the brake disk Drl and the corresponding brake pads) will be referred to as "service brake SBL", whereas the service brake for the rear right wheel RR (i.e., the brake disk Drr and the corresponding brake pads) will be referred to as "service brake SBR."

The service brakes SBL and SBR are disposed in the vicinity of the parking brakes 40L and 40R, respectively. Therefore, heat generated at the service brake SBL and heat generated at the service brake SBR during traveling of the vehicle are transferred to the parking brakes 40L and 40R, respectively. As a result, the temperatures of the parking brakes 40L and 40R (their drum sections 41 and brake shoes 42) always become roughly equal to the temperatures of the service brakes SBL and SBR (their brake disks Drl and Drr and corresponding brake pads).

<Outline of Basic Electric Parking Brake Control>

Next, the outline of basic electric parking brake control of the electric parking brake apparatus having the above-described structure will be described.

Manual Activation Control:

Once the driver operates the activation switch 61 for a short period of time, the parking brake control unit 70 drives the electric motor 21 to rotate in the forward direction. As a result, the tension Fw of the base wire 31, which serves as a quantity related to pressure contact force (hereinafter referred to as a "pressure-contact-force-related quantity"), starts to increase, and the braking forces of the left-hand and right-hand parking brakes 40L and 40R increase in accordance therewith.

When the tension Fw of the base wire 31 becomes equal to or greater than a target tension Fwt, which serves as a target pressure-contact-force-related quantity, the parking brake control unit 70 stops the electric motor 21. The target tension Fwt is set to correspond to a tension of the base wire 31 in a state in which the parking brakes 40L and 40R are in an activated state (in which the parking brakes 40L and 40R can stop the vehicle completely and maintain the stopped state), and changes in accordance with the stopped condition of the vehicle. Details of the setting of the target tension Fwt will be described later. Accordingly, after that point in time, the parking brakes 40L and 40R are in the activated state, and the vehicle can be stopped, and maintained in the stopped state, by the braking forces of the parking brakes 40L and 40R. The above is the outline of manual activation control. This manual activation control corresponds to parking brake activation control, and means for executing this manual activation control corresponds to as control means.

Manual Deactivation Control:

Once the deactivation switch 62 is operated by the driver for a short period of time, the parking brake control unit 70 drives the electric motor 21 to rotate in the reverse direction. As a result, the tension Fw of the base wire 31 starts to decrease, and the braking forces of the left-hand and right-hand parking brakes 40L and 40R decrease in accordance therewith.

When the tension Fw of the base wire 31 becomes equal to or less than a parking-brake-deactivation completion reference value Flow (fixed value), the parking brake control unit 70 stops the electric motor 21. The parking-brake-deactivation completion reference value Flow is set to correspond to a tension of the base wire 31 (e.g., "0") in a state in which the parking brakes 40L and 40R are in a deactivated state (in which the parking brakes 40L and 40R generate no braking force). Accordingly, after that point in time, the parking brakes 40L and 40R are in the deactivated state. The above is the outline of the manual deactivation control.

As described above, in the basic electric parking brake control, the parking brake control unit 70 determines whether the parking brake manual activation control or the parking brake manual deactivation control is to be started, and accordingly starts the parking brake manual activation control or the parking brake manual deactivation control. Further, the parking brake control unit 70 determines whether the parking brake manual activation control or the parking brake manual deactivation control is to be ended, and accordingly ends the parking brake manual activation control or the parking brake manual deactivation control.

The above-described manual deactivation control is performed only when an unillustrated ignition switch is "ON." In contrast, the above-described manual activation control is performed irrespective of whether the ignition switch is "ON" or "OFF." The above is the outline of the basic electric parking brake control.

<Outline of Parking Brake Re-activation Control after Parking Brake Activation Control>

Next, there will be described the outline of parking brake re-activation control to be performed after performance of parking brake activation control (after performance of manual activation control).

Parking Brake Re-activation Control to be Performed in Response to Release of the Brake Pedal:

In the case where the parking brakes 40L and 40R are in an activated state upon completion of the above-described manual activation control, the paired brake shoes 42 pressed against the drum section 41 can move by the above-described minute angle in the wheel rotation direction when a change arises in the force in the wheel rotation direction that the brake shoes 42 receive from the drum section 41. When the brake shoes 42 pressed and held against the drum section 41 move by the above-described minute angle in the wheel rotation direction, as described previously, the braking forces of the parking brakes 40L and 40R may decrease in response to a drop in the tension of the wire structure portion 30.

Meanwhile, in the case where the parking brake activation control (manual activation control), started with the brake pedal BP for the service brakes being in an operated state, ends, and subsequently, the brake pedal BP enters an unoperated state (released state); in particular, when the vehicle is stopped on an inclined road surface which inclines in the pitching direction of the vehicle; i.e., when the absolute value of an inclination angle θ detected by the inclination angle sensor 56 is large, the force in the wheel rotation direction that the brake shoes 42 receive from the drum section 41 changes by an amount corresponding to a component of force along a direction parallel to the road surface stemming from the mass of the vehicle, whereby the paired brake shoes 42 may move in the wheel rotation direction.

In view of the above, in the case where the brake pedal sensor 53 continues output of the signal indicating operation of the brake pedal BP when the above-described manual activation control ends, the parking brake control unit 70 continuously monitors the signal output from the brake pedal sensor 53 so as to determine whether the signal indicating operation of the brake pedal BP has changed to the signal indicating release of the brake pedal BP.

When the signal output from the brake pedal sensor 53 has changed to indicate release of the brake pedal BP, the parking brake control unit 70 executes parking brake re-activation control, which is similar to the above-described manual activation control, irrespective of whether the braking forces of the parking brakes 40L and 40R have dropped. This operation ensures that the tension Fw of the base wire 31 is maintained equal to the target tension Fwt, to thereby enable reliable stopping of the vehicle and maintaining the stopped state.

Figure 3:
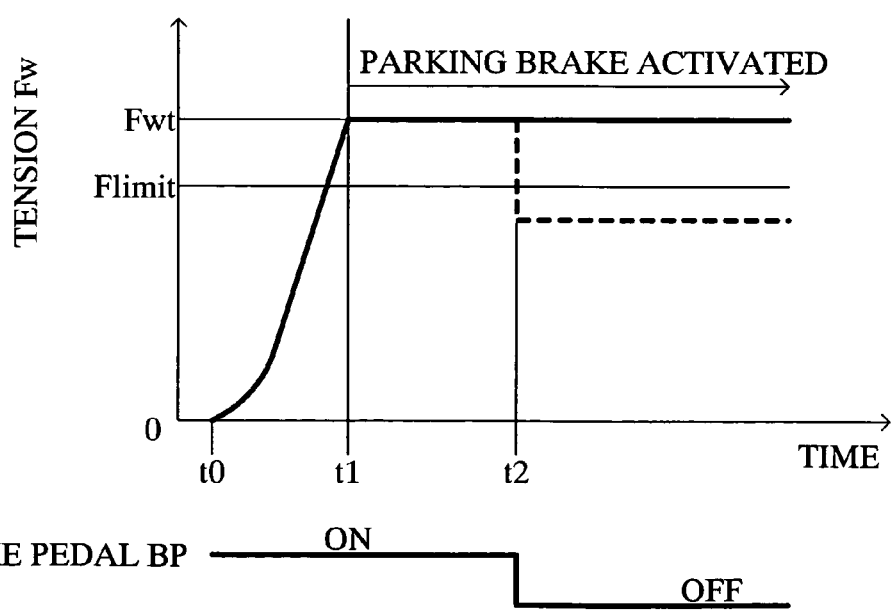
FIG. 3 is a time chart showing a change in the state of a brake pedal and a change in tension of a base wire in the case where parking brake re-activation control is performed in response to release of the brake pedal.

FIG. 3 is a time chart showing a change in the state of the brake pedal BP and a change in tension Fw of the base wire 31 in the case where parking brake re-activation control is performed in response to release of the brake pedal. Here, the target tension Fwt is assumed to be constant (the same value between times t1 and t2), and the tension Fw of the base wire 31 is assumed not to drop with a drop in the temperatures of the components of the parking brakes 40L and 40R.

As shown in FIG. 3, where the driver is assumed to operate the activation switch 61 at time t0, the parking brake control unit 70 starts the above-described manual activation control (parking brake activation control) at time t0, so that the tension Fw of the base wire 31 starts to increase from zero. When the tension Fw of the base wire 31 reaches the target tension Fwt at time t1, the parking brake control unit 70 ends the manual activation control. As a result, after time t1, the parking brakes 40L and 40R enter an activated state. The driver is assumed to operate the brake pedal BP continuously from time t0 to time t1.

Here, the driver is assumed to continue operation of the brake pedal BP after time t1 until time t2, and to release the brake pedal BP at time t2. In such a case, if the above-described parking brake re-activation control is not performed in response to the release of the brake pedal BP, as indicated by a broken line in FIG. 3, the tension Fw of the base wire 31 starts to decrease at time t2 from the target tension Fwt to a value smaller than the target tension Fwt and smaller than the minimum tension Flimit necessary to stop the vehicle and maintain it in the stopped state. As a result, the electric parking brake apparatus enters a state in which the apparatus can neither stop the vehicle nor maintain the vehicle in the stopped state In contrast, the parking brake control unit 70 of the present embodiment again performs the parking brake activation control at time t2. As a result, as indicted by a solid line in FIG. 3, the tension Fw of the base wire 31 returns to the target tension Fwt immediately at time t2 (or immediately after time t2), whereby the state in which the vehicle can be stopped and maintained in the stopped state is continued. The above is the outline of the parking brake re-activation control performed in response to release of the brake pedal.

Parking Brake Re-activation Control to be Performed in Response to Change in Shift Position:

In the case where the position of the shift lever SL is changed (e.g., from the D position to the N position, or from the N position to the D position) after completion of the above-described manual activation control (the parking brake activation control) (and the brake pedal BP is presently in an unoperated state), the drive torque (drive force) output from the engine E/G and acting on the drive wheels (in the present embodiment, the two rear wheels) of the vehicle changes, and thus the force in the wheel rotation direction that the brake shoes 42 (in particular, the brake shoes 42 for the drive wheels) receive from the drum section 41 changes by an amount corresponding to the change in the drive torque acting on the drive wheels, whereby the brake shoes 42 may move in the rotation direction.

In view of the above, after completion of the above-described manual activation control, the parking brake control unit 70 continuously monitors the signal output from the shift position sensor 55, in order to determine whether the position Pos of the shift lever SL has changed.

When the position Pos of the shift lever SL indicated by the signal output from the shift position sensor 55 has changed, the parking brake control unit 70 executes parking brake re-activation control, which is similar to the above-describe manual activation control, irrespective of whether the braking forces of the parking brakes 40L and 40R have dropped. This operation ensures that the tension Fw of the base wire 31 is maintained equal to the target tension Fwt, to thereby enable the vehicle to be reliably stopped and maintained in the stopped state. Notably, after completion of the above-described manual activation control, the parking brake control unit 70 executes the parking brake re-activation control every time the position Pos of the shift lever SL changes until the above-described manual deactivation control is started (the deactivation switch 62 is operated) or the ignition switch is turned off.

Figure 4:
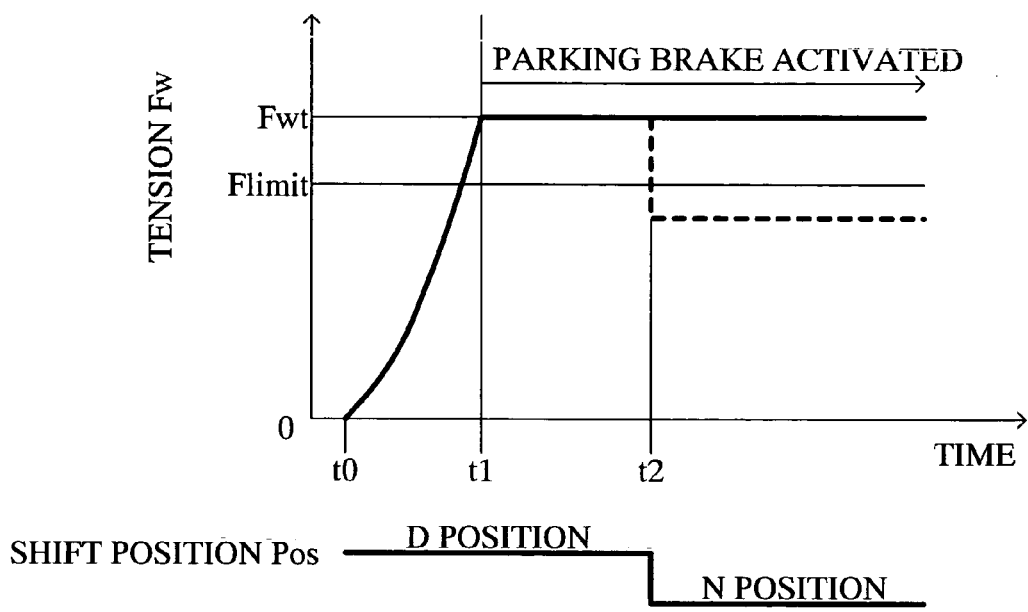
FIG. 4 is a time chart showing a change shift position and a change in tension of the base wire in the case where parking brake re-activation control is performed in response to a change in shift position.

FIG. 4 is a time chart showing a change in the position Pos of the shift lever SL and a change in tension Fw of the base wire 31 in the case where parking brake re-activation control is performed in response to a change in shift position. Here, the target tension Fwt is assumed to be constant (the same value between times t1 and t2), and the tension Fw of the base wire 31 is assumed not to drop with a drop in the temperatures of the components of the parking brakes 40L and 40R.

As shown in FIG. 4, where the driver is assumed to operate the activation switch 61 at time t0, the parking brake control unit 70 starts the above-described manual activation control (parking brake activation control) at time t0, as in the previously described case depicted in FIG. 3. When the tension Fw of the base wire 31 reaches the target tension Fwt at time t1, the parking brake control unit 70 ends the manual activation control. As a result, from time t1, the parking brakes 40L and 40R enter an activated state. The driver is assumed to maintain the shift lever SL at the D position continuously during a period from time t0 to time t1.

Here, the driver is assumed to maintain the shift lever SL at the D position continuously after time t1 until time t2, and to move the shift lever SL to the N position at time t2. In such a case, if the above-described parking brake re-activation control is not performed in response to the change in the shift position, as indicated by a broken line in FIG. 4, the tension Fw of the base wire 31 starts to decrease at time t2 from the target tension Fwt to a value smaller than the minimum tension Flimit. As a result, the electric parking brake apparatus enters a state in which the apparatus can neither stop the vehicle nor maintain the vehicle in the stopped state.

In contrast, the parking brake control unit 70 of the present embodiment again performs the parking brake activation control at time t2. As a result, as indicted by a solid line in FIG. 4, the tension Fw of the base wire 31 returns to the target tension Fwt immediately at time t2 (or immediately after time t2), whereby the state in which the vehicle can be stopped and maintained in the stopped state is continued. The above is the outline of the parking brake re-activation control performed in response to a change in the shift position.

Parking Brake Re-activation Control to be Performed in Response to Change in the Total Mass of the Vehicle:

In the case where the total mass of the vehicle changes because of an occupant entering or exiting the vehicle after completion of the above-described manual activation control (parking brake activation control), in particular, in the case where the vehicle is stopped on an inclined road surface which inclines in the pitching direction of the vehicle; i.e., when the absolute value of an inclination angle θ detected by the inclination angle sensor 56 is large, the force in the wheel rotation direction that the brake shoes 42 receive from the drum section 41 changes by an amount corresponding to a component of force along a direction parallel to the road surface stemming from the total mass of the vehicle, whereby the paired brake shoes 42 may move in the wheel rotation direction.

In view of the above, the parking brake control unit 70 sets, as a reference vehicle height Ho, a vehicle height Ha which is detected by the vehicle height sensor 58 at the time of completion of the above-described manual activation control, and after that time, continuously monitors the absolute value |Ha−Ho| of the difference between the vehicle height Ha detected by the vehicle height sensor 58 and the reference vehicle height Ho.

When the absolute value |Ha−Ho| of the difference exceeds a predetermined threshold Hb, the parking brake control unit 70 executes parking brake activation control, which is similar to the above-describe manual activation control, irrespective of whether the braking forces of the parking brakes 40L and 40R have dropped. This operation ensures that the tension Fw of the base wire 31 is maintained equal to the target tension Fwt, to thereby enable reliable stopping of the vehicle and maintenance of the stopped state.

Notably, after completion of the above-described parking brake activation control (re-activation control), every time the re-activation control ends, the parking brake control unit 70 repeatedly executes the above-described operation of setting, as the reference vehicle height Ho, the vehicle height Ha at that time, and executing the parking brake re-activation control when the absolute value |Ha−Ho| of the difference exceeds the predetermined threshold Hb, until the above-described manual deactivation control is started (the deactivation switch 62 is operated) or the ignition switch is turned off. The above is the outline of the parking brake re-activation control performed in response to a change in the total mass of the vehicle.

As described above, the parking brake control unit 70 again executes the parking brake activation control when the magnitude of the force in the wheel rotation direction that the brake shoes 42 receive from the drum 41 has changed (or may change).

Parking Brake Re-activation Control to be Performed in Response to Drop in Brake Temperature After completion of the above-described manual activation control (parking brake activation control), the braking forces of the parking brakes 40L and 40R decrease in accordance with drops in the temperatures of the drum section 41 and the brake shoes 42, which are components of the parking brakes 40L and 40R. The rates of temperature decrease of the drum section 41 and the brake shoes 42 increase with the differences between the ambient temperature and the temperatures of the drum section 41 and the brake shoes 42. Further, as described previously, the temperatures of the drum section 41 and the brake shoes 42 become roughly equal to that of the corresponding service brake SBL or SBR (the brake disk Drl or Drr and the corresponding brake pads).

In view of the above, the parking brake control unit 70 always estimates the temperature Tb of the service brake SBL (or SBR), which, as will be described later, changes with time, and after completion of the manual activation control, again executes the above-described parking brake activation control, at a time corresponding to the difference (Tb−Ta) between the estimated temperature Tb of the service brake SBL (or SBR) and the ambient temperature Ta detected by the ambient temperature sensor 57 (a time corresponding to a degree of temperature drop of the service brake). First, a method of estimating the temperature Tb of the service brake SBL (or SBR) will be described.

Now, there is considered the balance of heat quantity of the service brake SBL (or SBR) during a period from a certain time t until elapse of a calculation period $\Delta t$ of the parking brake control unit 70. As expressed by the following Equation 1, a change amount $\Delta Q(k)$ of the heat quantity of the service brake SBL (or SBR) during a single calculation period $\Delta t$ is equal to a value obtained by subtracting a heat radiation quantity Qout, which is a quantity of heat radiated from the service brake SBL (or SBR), from a heat accumulation quantity Qin, which is a quantity of heat accumulated in the service brake SBL (or SBR). In Equation 1, (k) represents that $\Delta Q$ is the present calculated value.

$$\Delta Q(k) = Q\text{in} - Q\text{out} \qquad \text{Eq. 1}$$

The heat accumulation quantity Qin and the heat radiation quantity Qout will be independently discussed below. First, the heat accumulation quantity Qin will be discussed. The quantity of heat accumulated in the service brake SBL (or SBR) within the single calculation period $\Delta t$ is considered to be proportional to a quantity of work based on a frictional force generated by the brake shoes 42. Therefore, the quantity of accumulated heat is considered to be proportional to a brake pedal operation force Fb and a distance over which the friction surfaces 42a of the brake shoes 42 move relative to the inner circumferential surface 41a of the drum section 41 within the single calculation period $\Delta t$.

The distance over which the friction surfaces 42a of the brake shoes 42 move relative to the inner circumferential surface 41a of the drum section 41 within the single calculation period $\Delta t$ is proportional to the product of a vehicle body speed (estimated vehicle body speed) Vso of the vehicle and the calculation period $\Delta t$. Therefore, the heat accumulation quantity Qin can be represented by the following Equation 2.

$$Q\text{in} = K\text{in} \cdot Fb \cdot Vso \cdot \Delta t \qquad \text{Eq. 2}$$

In Equation 2, Kin represents a predetermined constant of proportionality (fixed value). Fb represents a brake pedal operation force detected by the brake pedal sensor 53 in the present calculation period; and Vso represents an estimated vehicle body speed of the vehicle obtained from the following Equation 3 in the present calculation period. In Equation 3, Vwrl and Vwrr represent a rear-left wheel speed and a rear-right wheel speed, respectively, which are detected by the wheel speed sensors 51rl and 51rr, respectively, in the present calculation period.

$$Vso = (Vwrl + Vwrr)/2 \qquad \text{Eq. 3}$$

Next, the heat radiation quantity Qout will be discussed. The quantity of heat radiated from the service brake SBL (or SBR) within the single calculation period $\Delta t$ is considered to be proportional to the product of the calculation period $\Delta t$ and the difference (Tb−Ta) between the temperature Tb of the service brake SBL (or SBR) and the ambient temperature Ta at time t. Further, as the speed of the vehicle increases, air in the vicinity of the service brake SBL (or SBR) flows at higher speed, whereby the heat accumulated in the service brake SBL (or SBR) can be radiated more easily. Therefore, the quantity of heat radiated from the service brake SBL (or SBR) within the single calculation period $\Delta t$ is considered to increase with the estimated vehicle body speed Vso. Accordingly, the heat radiation quantity Qout can be represented by the following Equation 4.

$$Q\text{out} = K\text{out} \cdot Kv \cdot (Tb(k) - Ta) \cdot \Delta t \qquad \text{Eq. 4}$$

Figure 5:
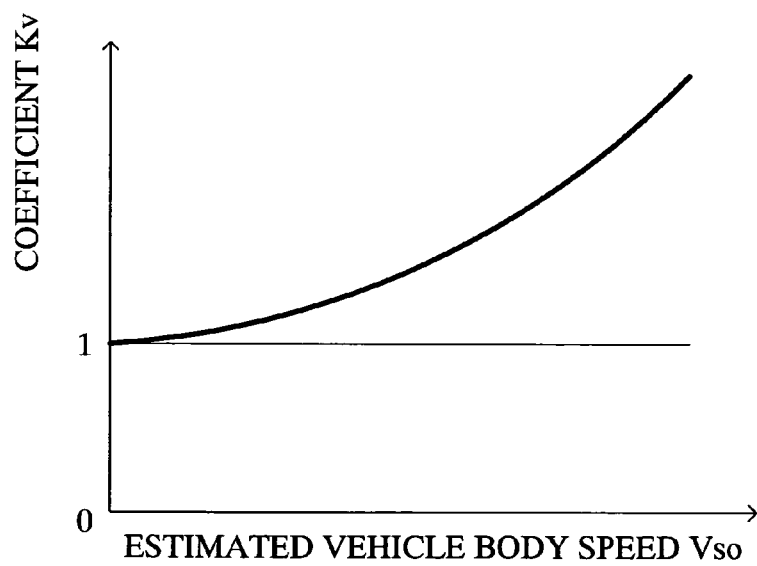
FIG. 5 is a graph showing a table which defines the relation between estimated vehicle-body speed Vso and coefficient Kv and which a CPU shown in FIG. 1 refers.

In Equation 4, Kout represents a predetermined constant of proportionality (fixed value). Kv represents a coefficient which, as depicted in FIG. 5, increases from "1" as the estimated vehicle speed Vso calculated by Equation 3 increases from "0." Tb(k) represents the present calculated value of the temperature Tb of the service brake SBL (or SBR).

In the above-described manner, the change amount $\Delta Q(k)$ of the heat quantity of the service brake SBL (or SBR) during the single calculation period $\Delta t$ can be obtained from the above-described Equations 1 to 4. Further, a change in temperature of the service brake SBL (or SBR) during the single calculation period Δt is considered to be proportional to the change ΔQ(k) of the heat quantity, so that the following Equation 5 holds for Tb(k+1), which is a calculated value of the temperature Tb of the service brake SBL (or SBR) to be used in the next calculation.

$$Tb(k+1)=Tb(k)+Kcnv \cdot \Delta Q(k) \qquad \text{Eq. 5}$$

In Equation 5, Kcnv is a predetermined constant of proportionality (fixed value). Therefore, from the above-described Equation 5 (and Equations 1 to 4), the temperature Tb of the service brake SBL (or SBR), which changes from moment to moment, can be estimated for every passage of the calculation period Δt. On the basis of Equation 5, the parking brake control unit 70 estimates the temperature Tb of the service brake SBL (or SBR); i.e., the temperatures of the drum section 41 and the brake shoes 42 of each of the parking brakes 40L and 40R. The means for performing this calculation corresponds to temperature acquisition means.

At the point in time when the above-described manual activation control ends, the parking brake control unit 70—which repeatedly calculates the temperature Tb of the service brake SBL (or SBR—calculates the difference (Tb−Ta) between the temperature Tb of the service brake SBL (or SBR) estimated at that time and the ambient temperature Ta detected by the ambient temperature sensor 57. Subsequently, on the basis of the temperature difference (Tb−Ta) and a table shown in FIG. 6 and defining the relation between the temperature difference (Tb−Ta) and re-activation time Tm, the parking brake control unit 70 obtains a re-activation time Tm, which represents a period subsequent to that point in time and before re-execution of the above-described parking brake activation control. Thus, the re-activation time Tm is obtained in such a manner that the re-activation time Tm decreases as the temperature difference (Tb−Ta) increases.

When the re-activation time Tm has elapsed after completion of the above-described manual activation control, the parking brake control unit 70 executes the above-described parking brake re-activation control irrespective of whether the braking forces of the parking brakes 40L and 40R have dropped. This operation ensures that the tension Fw of the base wire 31 is maintained equal to the target tension Fwt, to thereby enable the vehicle to be reliably stopped and maintained in the stopped state.

Notably, even after completion of the parking brake re-activation control performed in response to a drop in the brake temperature, every time the re-activation control ends, the parking brake control unit 70 repeatedly executes the above-described operation of obtaining the re-activation time Tm for the next re-activation on the basis of the temperature difference (Tb−Ta) at that point in time, and executing the parking brake activation control when the re-activation time Tm elapses, until the above-described manual deactivation control is started (the deactivation switch 62 is operated) or the ignition switch is turned off.

Figure 7:
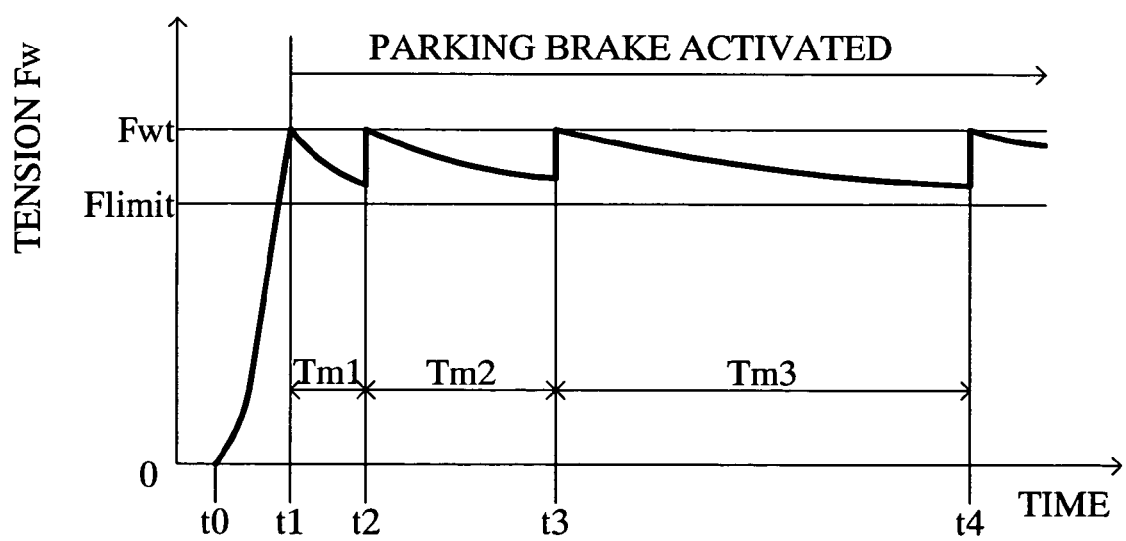
FIG. 7 is a time chart showing a change in tension of the base wire in the case where parking brake re-activation control is performed in response to a drop in brake temperature.

FIG. 7 is a time chart showing a change in tension Fw of the base wire 31 in the case where parking brake re-activation control is performed in response to a drop in the brake temperature. In this example as well, the target tension Fwt is assumed to be constant (the same value at times t1, t2, t3, and t4).

As shown in FIG. 7, where the driver is assumed to operate the activation switch 61 at time t0, as in the previously described case shown in FIG. 3, the parking brake control unit 70 starts the above-described manual activation control (parking brake activation control) at time t0, and when the tension Fw of the base wire 31 reaches the target tension Fwt at time t1, the parking brake control unit 70 ends the manual activation control.

As a result, after time t1, the parking brakes 40L and 40R are in an activated state. Here, the driver is assumed to have operated the brake pedal BP frequently during the traveling of the vehicle before time t0, and the estimated temperature Tb of the service brake SBL (or SBR) at time t1 is assumed to be considerably higher than the ambient temperature Ta.

At time t1, the parking brake control unit 70 obtains the re-activation time Tm1 on the basis of the temperature difference (Tb−Ta) at time t1. Since the temperature difference (Tb−Ta) at time t1 is large, the re-activation time Tm1 obtained at that time is relatively short.

During a period from time t1 to time t2, at which the re-activation time Tm1 elapses, the temperatures of the drum section 41 and the brake shoes 42 of each of the parking brakes 40L and 40R drop, and the tension Fw of the base wire 31 decreases in accordance with the temperature drop. Since the vehicle is in a stopped state during the period from time t1 to time t2, the above-mentioned heat accumulation quantity Qin is zero, and the above-mentioned heat radiation quantity Qout assumes a positive value, so that the estimated temperature Tb of the service brake SBL (or SBR) also drops.

Upon having reached time t2, the parking brake control unit 70 again executes the parking brake activation control. As a result, the tension Fw of the base wire 31 returns to the target tension Fwt immediately at time t2 (or immediately after time t2) without becoming lower than the above-mentioned minimum value Flimit, whereby a state in which the vehicle can be stopped and maintained at the stopped state continues. Moreover, at time t2, the parking brake control unit 70 obtains the re-activation time Tm2 on the basis of the temperature difference (Tb−Ta) at time t2. Since the temperature difference (Tb−Ta) at time t2 is smaller than the temperature difference (Tb−Ta) at time t1, the re-activation time Tm2 obtained at time t2 is longer than the re-activation time Tm1.

Subsequently, upon having reached time t3 after elapse of the re-activation time Tm2 from time t2, as in the case of time t2, the parking brake control unit 70 again executes the parking brake activation control, and again obtains the re-activation time Tm3 for the next re-activation, on the basis of (Tb−Ta) at time t3. Since the temperature difference (Tb−Ta) at time t3 is smaller than the temperature difference (Tb−Ta) at time t2, the re-activation time Tm3 obtained at that time is longer than the re-activation time Tm2. Similarly, upon having reached time t4 after elapse of the re-activation time Tm3 from time t3, the parking brake control unit 70 again executes the parking brake activation control.

The above is the outline of the parking brake re-activation control performed in response to a drop in the brake temperature. In this manner, after completion of the above-described manual activation control, the parking brake control unit 70 again executes the parking brake activation control upon elapse (every time) of a time corresponding to the degree of drop in the estimated temperature Tb of the service brake SBL (or SBR).

Setting of the Target Tension:

The magnitude of a force (external force, drive torque of the engine E/G) acting on the stopped vehicle in a direction for moving the vehicle forward or backward also varies depending on the stopped condition of the vehicle, such as inclination angle of the vehicle in the pitching direction, the position of the shift lever SL, and the rotation speed of the engine E/G.

Accordingly, the brake force of the parking brakes 40L and 40R (i.e., the pressure contact force of the brake shoes 42) required to stop the vehicle and maintain it in the stopped state varies depending on the stopped condition of the vehicle. Further, when the temperatures of the drum section 41 and the brake shoes 42 of each of the parking brakes 40L and 40R increase, the friction coefficient of the friction surfaces 42a of the brake shoes 42 decreases as a result of fading, so that the brake forces of the parking brakes 40L and 40R decrease even when the pressure contact force of the brake shoes 42 remains constant.

In view of the foregoing, the parking brake control unit 70 obtains the target tension Fwt of the base wire 31 to be used in the parking brake activation control, on the basis of the following Equation 6.

$$Fwt = Fwtbase + \Delta Fwt \quad \text{Eq. 6}$$

In Equation 6, Fwtbase represents a base target tension (fixed value), which is a value near the lower limit of the tension Fw of the base wire 31 which is required to stop the vehicle and maintain it in the stopped state. The lower limit is determined in consideration of a drop in the tension Fw of the base wire 31 which occurs because of temperature drops of the drum section 41 and the brake shoes 42 during the above-described re-activation time Tm, for the case where neither the above-described external force nor the drive torque of the engine acts on the vehicle; i.e., in the case where the inclination angle θ in the pitching direction is zero, and the position Pos of the shift lever SL is the P position or N position. In Equation 6, ΔFwt represents an addition target tension, which can be obtained on the basis of the following Equation 7.

$$\Delta Fwt = fw(\theta, Ne, Pos) \cdot Kfade \quad \text{Eq. 7}$$

In Equation 7, the function fw is a function for obtaining a value of 0 or greater, while using, as arguments, the inclination angle θ in the pitching direction detected by the inclination angle sensor 56, the engine rotation speed Ne detected by the rotation speed sensor 54, and the position Pos of the shift lever SL. For example, when the inclination angle θ is zero and the position Pos of the shift lever SL is the P position or the N position, the value of fw(θ, Ne, Pos) becomes zero. The value of fw(θ, Ne, Pos) increases with the absolute value of the inclination angle θ, and with the engine rotation speed Ne when the shift lever SL is positioned at neither the P position nor the N position.

Figure 8:
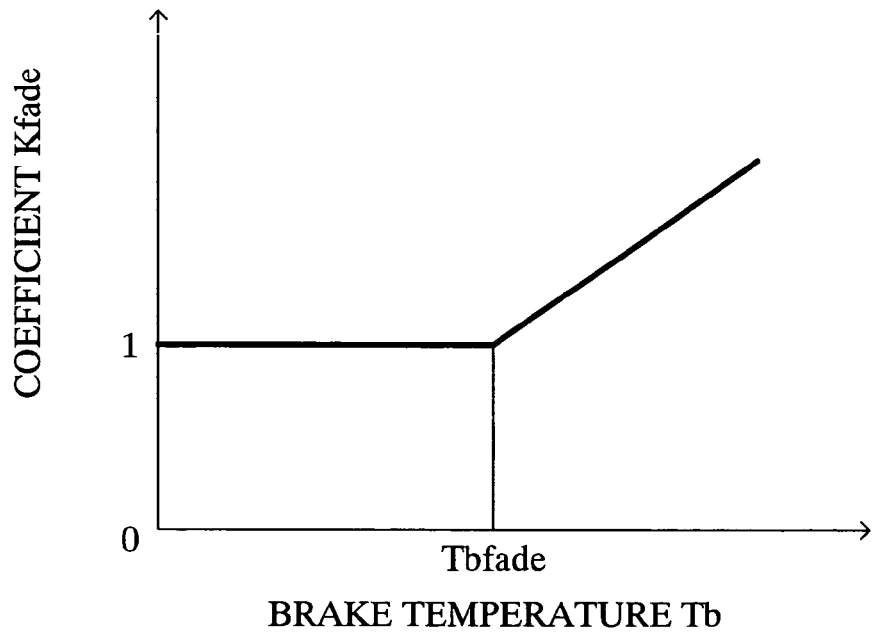
FIG. 8 is a graph showing a table which defines the relation between brake temperature Tb and coefficient Kfade and which the CPU shown in FIG. 1 refers.

In Equation 7, Kfade represents a coefficient which, as shown in FIG. 8, becomes "1" when the temperature Tb of the service brake SBL (or SBR), repeatedly calculated and updated by the above-described Equation 5, is lower than a predetermined value Tbfade, and increases from "1" as the temperature Tb increases from the predetermined value Tbfade, when the temperature Tb of the service brake SBL (or SBR) is equal to or higher than predetermined value Tbfade. In this manner, the target tension Fwt is updated in accordance with the stopped condition of the vehicle, and is set to increase with the temperature Tb of the service brake SBL (or SBR).

Parking Re-activation Control to be Performed in Response to Turning Off of the Ignition Switch:

After the point in time when the ignition switch is turned off, the parking brake control unit 70, in principle, cannot execute processing for the above-described various calculations, determinations, instructions, etc., and therefore cannot execute the above-described parking brake activation control. However, if the temperatures of the drum section 41 and the brake shoes 42 of each of the parking brakes 40L and 40R; i.e., the estimated temperature Tb of the service brake SBL (or SBR), is higher than the ambient temperature Ta when the ignition switch is turned off, the braking force of the parking brakes 40L and 40R decreases, after that point in time, and in some cases the vehicle cannot be stopped and maintained in the stopped state.

In view of the foregoing, when the ignition switch is turned off with the parking brakes 40L and 40R being in an activated state, the parking brake control unit 70 executes the above-described parking brake activation control only one time, in the following manner.

Figure 9:
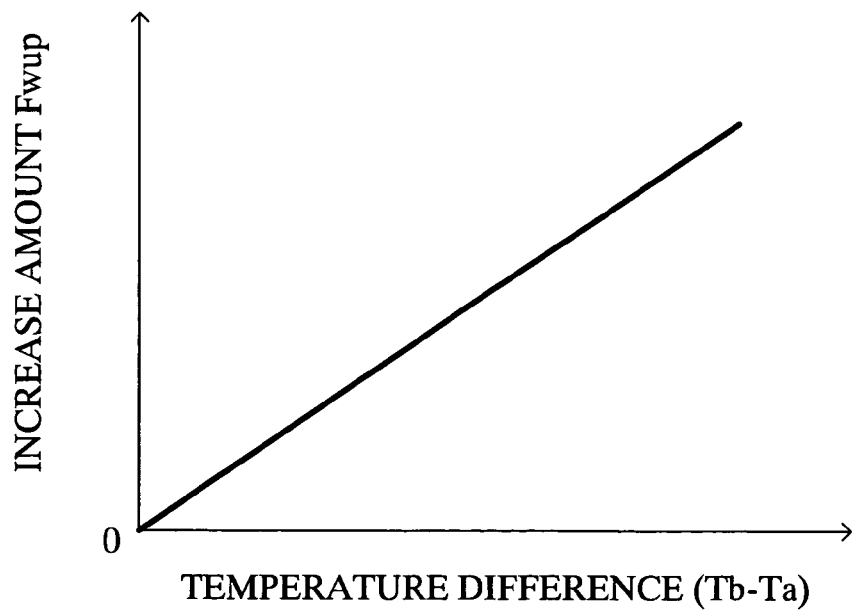
FIG. 9 is a graph showing a table which defines the relation between temperature difference (Tb−Ta) and increase amount Fwup and which the CPU shown in FIG. 1 refers.

Specifically, when the ignition switch is turned off, the parking brake control unit 70 obtains an increase amount Fwup on the basis of the temperature difference (Tb−Ta) at that point in time and with reference to a table shown in FIG. 9 and defining the relation between temperature difference (Tb−Ta) and the increase amount Fwup. Subsequently, the parking brake control unit 70 adds the increase amount Fwup to the target tension Fwt calculated from the above-described Equation 6, in order to obtain a new target tension Fwt, and executes the parking brake activation control only one time until the tension Fw of the base wire 31 becomes equal to the new target tension Fwt.

By virtue of the above-described operation, immediately after the ignition switch is turned off in the state in which the parking brakes 40L and 40R are in an activated state, the tension Fw of the base wire 31 assumes a value higher than the target tension Fwt calculated by use of the above-described Equation 6, by the increase amount Fwup, which increases with the temperature difference (Tb−Ta) at the time when the ignition switch is turned off. Accordingly, even in the case where the estimated temperature Tb of the service brake SBL (or SBR) is higher than the ambient temperature Ta when the ignition switch is turned off, the vehicle can be reliably stopped and maintained in the stopped state after the time when the ignition switch is turned off.

<Actual Operation>

Next, actual operation of the electric parking brake apparatus 10 according to the present invention configured as described above will be described with reference to FIGS. 10 to 18, which show, in the form of flowcharts, routines executed by the CPU 71.

Estimation of Brake Temperature:

First, estimation of the temperature of the service brake SBL (or SBR) will be described. At predetermined intervals (calculation period Δt), the CPU 71 repeatedly performs a routine shown in FIG. 10 and adapted to estimate a brake temperature. When a predetermined timing has been reached, the CPU 71 starts the processing from step 1000, and proceeds to step 1005 in order to determine whether the ignition switch has been turned on.

Here, the present point in time is assumed to be immediately after the time when the ignition switch has been turned on. In this case, the CPU 71 makes a "Yes" determination in step 1005, and proceeds to step 1010 in order to store an initial value Tbini of the temperature of the service brake SBL (or SBR) as a present temperature Tb(k) of the service brake SBL (or SBR). In the present embodiment, the initial value Tbini of the temperature of the service brake SBL (or SBR) is the ambient temperature Ta detected by the ambient temperature sensor 57.

Subsequently, the CPU 71 proceeds to step 1015 in order to calculate an estimated vehicle body speed Vso on the basis of the above-described Equation 3. Next, the CPU 71 proceeds to step 1020 in order to calculate a value for the coefficient Kv from the calculated estimated vehicle body speed Vso, with reference to a table illustrated in the block of step 1020, the table being similar to that shown in FIG. 5.

Next, the CPU 71 proceeds to step 1025 in order to calculate the above-described heat accumulation amount Qin from the brake pedal operation force Fb detected by the brake pedal sensor 53 and the above-described estimated vehicle body speed Vso, by use of the equation shown in the block of step 1025, the equation corresponding to the above-described Equation 2. The CPU 71 then proceeds to step 1030 in order to calculate the above-described heat radiation amount Qout from the present temperature Tb(k) of the service brake SBL (or SBR), the ambient temperature Ta detected by the ambient temperature sensor 57, and the value of the coefficient Kv, by use of the equation shown in the block of step 1030, the equation corresponding to the above-described Equation 4.

Subsequently, the CPU 71 proceeds to step 1035 in order to calculate a change amount $\Delta Q(k)$ of the heat quantity of the service brake SBL (or SBR) from the calculated heat accumulation amount Qin and the calculated heat radiation amount Qout, by use of the equation shown in the block of step 1035, the equation corresponding to the above-described Equation 1. The CPU 71 then proceeds to step 1040 in order to calculate a temperature Tb(k+1) of the service brake SBL (or SBR) to be used in the next calculation period, from the present temperature Tb(k) of the service brake SBL (or SBR) and the calculated heat quantity change $\Delta Q(k)$, by use of the equation shown in the block of step 1040, the equation corresponding to the above-described Equation 5. In subsequent step 1045, the CPU 71 substitutes the present temperature Tb(k) of the service brake SBL (or SBR) with the temperature Tb(k+1) of the service brake SBL (or SBR) calculated in step 1040 for the next calculation period, in preparation for calculation in the next calculation period. Subsequently, the CPU 71 proceeds to step 1095 so as to end the present routine.

After that point in time, the CPU 71 makes a "No" determination when proceeding to step 1005, and executes the processing of step 1045 every time the calculation period $\Delta t$ elapses, to thereby repeatedly update the present temperature Tb(k) of the service brake SBL (or SBR). Calculation of the present temperature Tb(k) of the service brake SBL (or SBR) is continuously performed until the ignition switch is turned off.

Manual Activation Control:

Next, there will be described the case where the above-described manual activation control is performed in the state in which the parking brakes 40L and 40R are in a deactivated state. At predetermined intervals, the CPU 71 repeatedly performs a routine shown in FIG. 11 and adapted to determine whether to start parking brake activation control or parking brake deactivation control. When a predetermined timing has been reached, the CPU 71 starts the processing from step 1100, and proceeds to step 1105 in order to determine whether the activation switch 61 has been operated (i.e., has been turned on) or the value of a target tension setting flag XRE has been changed from "0" to "1." When the value of the flag XRE is "1," this indicates that setting of the target tension Fwt, which will be described later, is currently performed; and when the value of the flag XRE is "0," this indicates that the setting of the target tension Fwt is not currently performed.

Here, the present point in time is assumed to be immediately after only the activation switch 61 has been operated by the driver. In this case, the CPU 71 makes a "Yes" determination when proceeding to step 1105, and then proceeds to step 1110 in order to set the value of a parking brake activation control performing flag XON to "1." Further, in subsequent step 1115, the CPU 71 sets the value of a parking brake deactivation control performing flag XOFF to "0." Next, the CPU 71 proceeds to step 1120.

When the value of the flag XON is "1," this indicates that the above-described manual activation control is currently performed; and when the value of the flag XON is "0," this indicates that the manual activation control is not currently performed. Further, when the value of the flag XOFF is "1," this indicates that the above-described manual deactivation control is currently performed; and when the value of the flag XOFF is "0," this indicates that the manual deactivation control is not currently performed.

After having proceeded to step 1120, the CPU 71 determines whether the deactivation switch 62 is operated (i.e., is turned on). Since the deactivation switch 62 is not operated at the present point in time, the CPU 71 makes a "No" determination in step 1120, and proceeds directly to step 1195 in order to end the present routine.

After that point in time, the CPU 71 repeatedly executes the processings in steps 1100, 1105 ("No" determination), 1120 ("No" determination), and 1195, so long as neither the activation switch 61 nor the deactivation switch 62 is operated, and the value of the flag XRE is not changed from "0" to "1."

Figure 12:
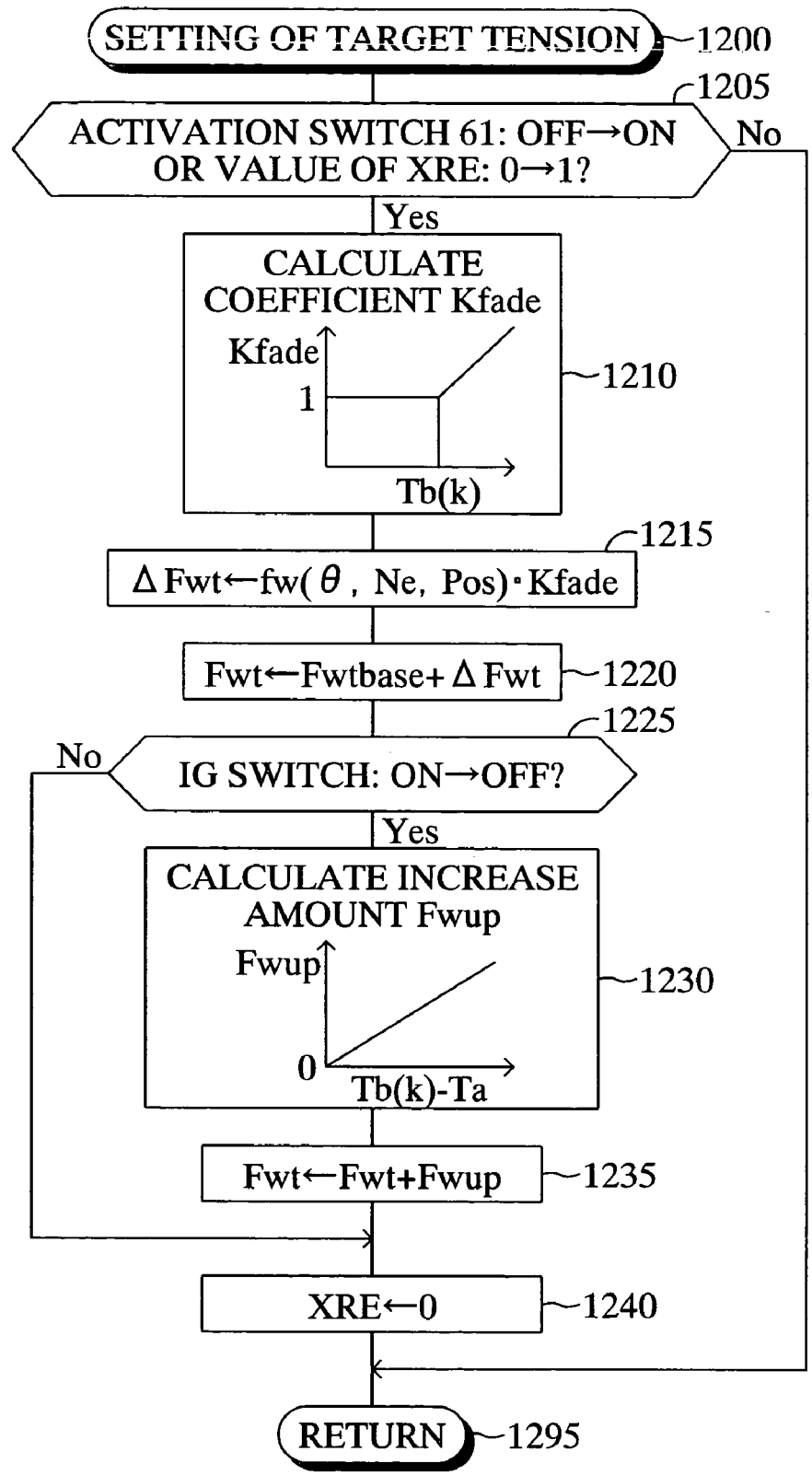
FIG. 12 is a flowchart showing a routine which the CPU shown in FIG. 1 executes in order to set a target tension.

Further, at predetermined intervals the CPU 71 repeatedly performs a routine shown in FIG. 12 and adapted to set a target tension Fwt. When a predetermined timing has been reached, the CPU 71 starts the processing from step 1200, and proceeds to step 1205 in order to determine whether the activation switch 61 has been operated (i.e., has been turned on) or the value of the target tension setting flag XRE has been changed from "0" to "1."

Here, the present point in time is assumed to be immediately after only the activation switch 61 has been operated by the driver. In this case, the CPU 71 makes a "Yes" determination when proceeding to step 1205, and then proceeds to step 1210 in order to obtain a value for the coefficient Kfade from the newest value of the temperature Tb(k) of the service brake SBL (or SBR) calculated in step 1045 of FIG. 10, with reference to the table illustrated in the block of step S1210, the table being similar to that shown in FIG. 8.

Next, the CPU 71 proceeds to step 1215 in order to calculate an addition target tension $\Delta Fwt$ on the basis of a value of the function fw, which is obtained by using, as arguments, the inclination angle $\theta$ in the pitching direction detected by the inclination angle sensor 56, the engine rotation speed Ne detected by the rotation speed sensor 54, and the position Pos of the shift lever SL; the above-described coefficient Kfade; and the above-described Equation 7. In subsequent step 1220, the CPU 71 calculates the target tension Fwt from the calculated addition target tension $\Delta Fwt$ by use of the above-described Equation 6.

Subsequently, the CPU 71 proceeds to step 1225 in order to determine whether the ignition switch has been turned off. Here, the ignition switch is assumed to be maintained "ON." In this case, the CPU 71 makes a "No" determination in step 1225, and proceeds to step 1240 in order to set the value of the target tension setting flag XRE to "0." The CPU 71 then proceeds to step 1295 in order to end the present routine.

After that point in time, the CPU 71 makes a "No" determination when proceeding to step 1205 and then proceeds directly to step 1295 to thereby end the present routine, so long as the activation switch 61 is not operated and the value of the target tension setting flag XRE is not changed from "0" to "1." Accordingly, the value of the target tension Fwt set through execution of the above-described step 1220 is not updated and is maintained as is until the activation switch 61 is operated or the value of the target tension setting flag XRE is changed from "0" to "1."

Figure 13:
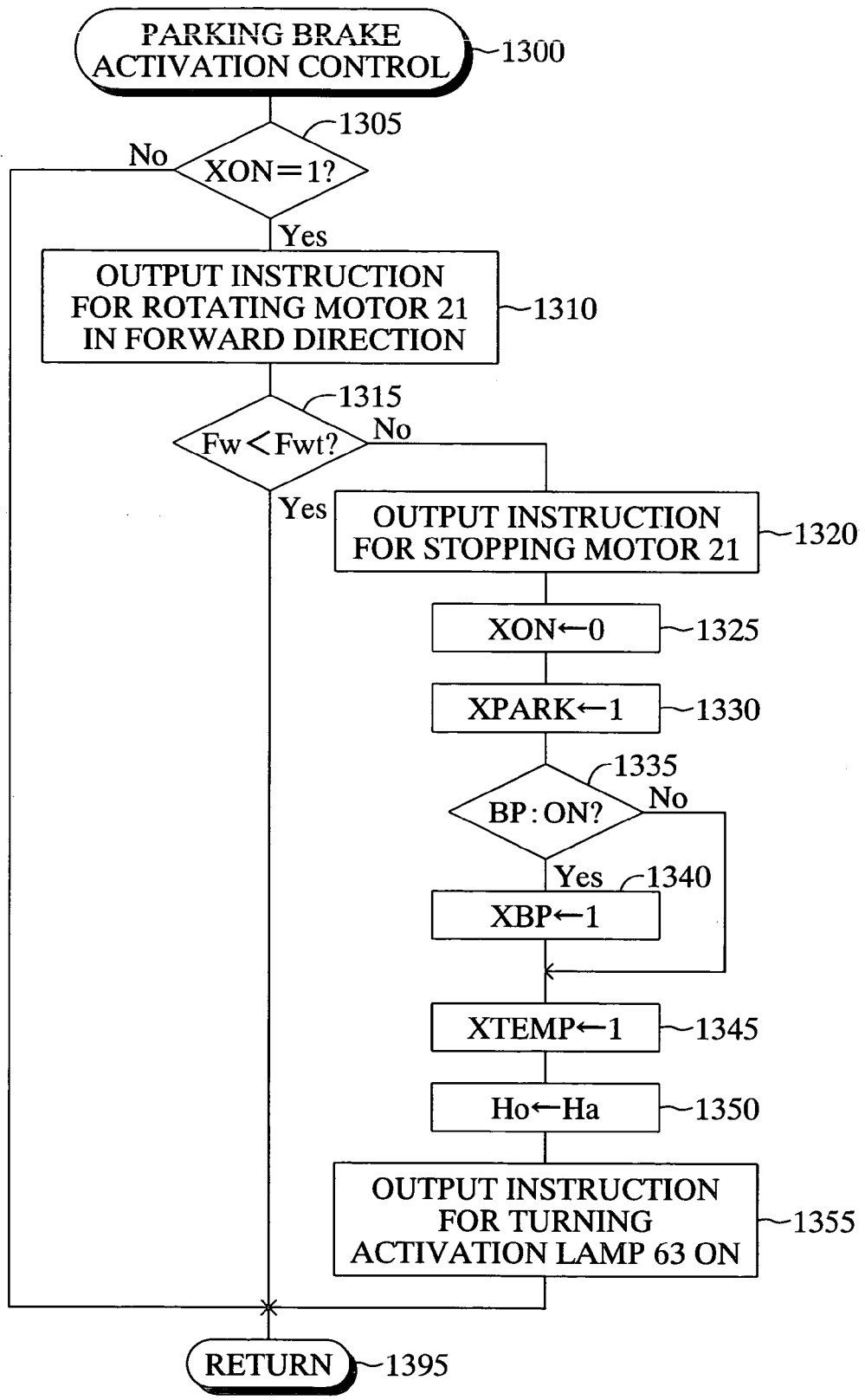
FIG. 13 is a flowchart showing a routine which the CPU shown in FIG. 1 executes in order to perform parking brake activation control.

Moreover, at predetermined intervals, the CPU 71 repeatedly performs a routine shown in FIG. 13 and adapted to perform parking brake activation control. When a predetermined timing has been reached, the CPU 71 starts the processing from step 1300, and proceeds to step 1305 in order to determine whether the value of the parking brake activation control performing flag XON is "1." When the CPU 71 makes a "No" determination, the CPU 71 proceeds directly to step 1395 in order to end the present routine.

Figure 11:
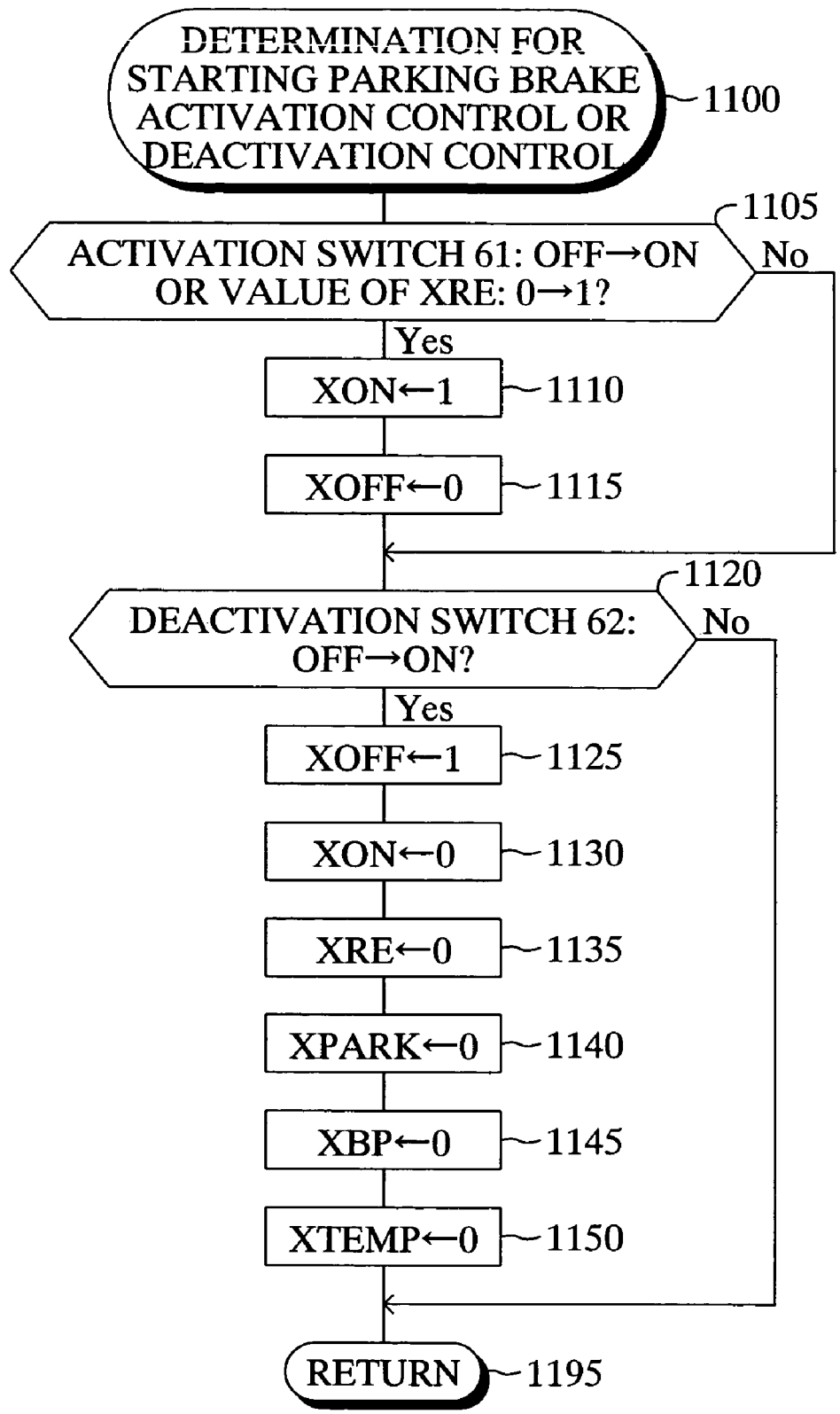
FIG. 11 is a flowchart showing a routine which the CPU shown in FIG. 1 executes in order to determine whether to start parking brake activation control or parking brake deactivation control.

At the present point in time, the value of the flag XON have been set to "1" as a result of execution of the above-described step 1110 of FIG. 11. Therefore, the CPU 71 makes a "Yes" determination in step 1305, and then proceeds to step 1310. In step 1310, the CPU 71 instructs an unillustrated drive circuit for the electric motor 21 to rotate the motor 21 in the forward direction with a predetermined electric power. As a result, the electric motor 21 is rotated in the forward direction with the predetermined electric power, whereby the braking forces of the parking brakes 40L and 40R start to increase.

Next, the CPU 71 proceeds to step 1315 in order to determine whether the tension Fw of the base wire 31 is less than the target tension Fwt calculated in the above-described step 1220 of FIG. 12. Since the present point in time is immediately after the forward rotation of the electric motor 21 has started, the tension Fw of the base wire 31 is less than the target tension Fwt. Therefore, the CPU 71 makes a "Yes" determination in step 1315, and then proceeds directly to step 1395 in order to end the present routine.

After that point in time, the CPU 71 repeatedly executes the processings in steps 1300, 1305 ("Yes" determination), 1310, 1315 ("Yes" determination), and 1395, so long as the tension Fw of the base wire 31, which increases because of the forward rotation of the electric motor 21, is less than the target tension Fwt.

When the tension Fw of the base wire 31 reaches the target tension Fwt after elapse of a predetermined time, the CPU 71 makes a "No" determination when proceeding to step 1315, and then proceeds to step 1320. In step 1320, the CPU 71 instructs the unillustrated drive circuit for the electric motor 21 to stop the drive of the motor 21. As a result, the electric motor 21 is stopped, and the parking brakes 40L and 40R enter the activated state.

Next, the CPU 71 proceeds to step 1325 in order to set the value of the parking brake activation control performing flag XON to "0," and then proceeds to step 1330 in order to set the value of an activation condition flag XPARK to "1." When the value of the flag XPARK is "1," this indicates that the parking brakes 40L and 40R are in an activated state, and when the value of the flag XPARK is "0," this indicates that the parking brakes 40L and 40R are not in an activated state.

Subsequently, the CPU 71 proceeds to step 1335 in order to determine whether the brake pedal sensor 53 outputs a signal indicative of operation of the brake pedal BP. When the CPU 71 makes a "Yes" determination in step 1335, the CPU 71 proceeds to step 1340 in order to set the value of a brake-pedal ON flag XBP to "1," and then proceeds to step 1345. In contrast, when the CPU 71 makes a "No" determination in step 1335, the CPU 71 proceeds directly to step 1345. When the value of the brake-pedal ON flag XBP is "1," this indicates that the parking brake activation control has ended in a state in which the brake pedal BP is operated, and the operation of the brake pedal BP continues. When the value of the brake-pedal ON flag XBP is "0," this indicates that the parking brake activation control has ended in a state in which the brake pedal BP is operated, and the operation of the brake pedal BP does not continue.

In step 1345, the CPU 71 sets the value of a re-activation time counting flag XTEMP to "1." Next, the CPU 71 proceeds to step 1350 in order to set, as a reference vehicle height Ho, the vehicle height Ha detected by the vehicle height sensor 58, and then proceeds to step 1355 in order to instruct an unillustrated drive circuit for the activation lamp 63 to turn the activation lamp 63 on. Subsequently, the CPU 71 proceeds to step 1395 so as to end the present routine. As a result, the activation lamp 63 is turned on.

When the activation lamp 63 is "ON," this indicates that the parking brakes 40L and 40R are in an activated state. When the value of the re-activation time counting flag XTEMP is "1," this indicates that counting for determining whether the re-activation time Tm has elapsed is presently performed. When the value of the re-activation time counting flag XTEMP is "0," this indicates that the counting for determining whether the re-activation time Tm has elapsed is not presently performed. After that point in time, the CPU 71 makes a "No" determination when proceeding to step 1305, and then proceeds directly to step 1395 in order to end the present routine, so long as the value of the parking brake activation control performing flag XON is "0." In this manner, the parking brakes 40L and 40R are brought into an activated state through performance of the manual activation control.

Manual Deactivation Control:

Next, there will be described the case where the above-described manual deactivation control is performed in the state where the parking brakes 40L and 40R are in an activated state upon completion of the manual activation control. As described previously, the CPU 71 repeatedly executes the processings in steps 1100, 1105 ("No" determination), 1120 ("No" determination), and 1195 of FIG. 11, so long as neither the activation switch 61 nor the deactivation switch 62 is operated and the value of the target tension setting flag XRE is not changed from "0" to "1."

When only the deactivation switch 62 is operated by the driver in such a state, the CPU 71 makes a "Yes" determination when proceeding to step 1120, and then proceeds to step 1125 in order to set the value of the parking brake deactivation control performing flag XOFF to "1", and in subsequent step 1130, the CPU 71 sets the value of the parking brake activation control performing flag XON to "0." Further, in subsequent step 1135, the CPU 71 sets the value of the target tension setting flag XRE to "0," and in subsequent step 1140, the CPU 71 sets the value of the activation state indicating flag XPARK to "0." Moreover, in subsequent step 1145, the CPU 71 sets the value of the brake-pedal ON flag XBP to "0," and in subsequent step 1150, the CPU 71 sets the value of the re-activation time counting flag XTEMP to "0." Next, the CPU 71 proceeds to step 1195 in order to end the present routine.

After that point in time, again the CPU 71 repeatedly executes the processings in steps 1100, 1105 ("No" determination), 1120 ("No" determination), and 1195, so long as neither the activation switch 61 nor the deactivation switch 62 is operated and the value of the target tension setting flag XRE is not changed from "0" to "1."

Figure 14:
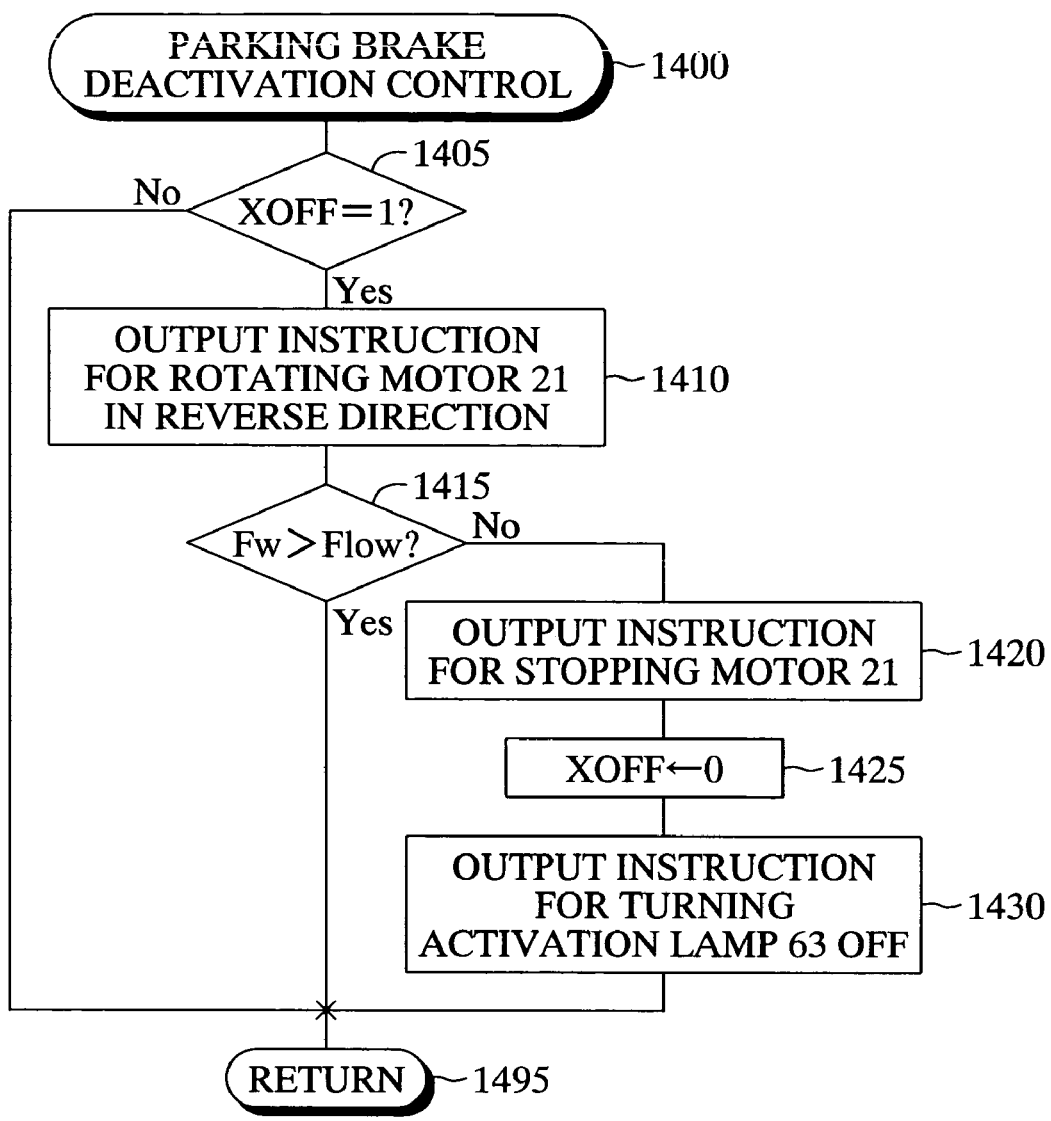
FIG. 14 is a flowchart showing a routine which the CPU shown in FIG. 1 executes in order to perform parking brake deactivation control.

Moreover, at predetermined intervals, the CPU 71 repeatedly performs a routine shown in FIG. 14 and adapted to perform parking brake deactivation control. When a predetermined timing has been reached, the CPU 71 starts the processing from step 1400, and proceeds to step 1405 in order to determine whether the value of the parking brake deactivation control performing flag XOFF is "1." When the CPU 71 makes a "No" determination, the CPU 71 proceeds directly to step 1495 in order to end the present routine.

At the present point in time, the value of the flag XOFF has been set to "1" as a result of execution of the above-described step 1125 of FIG. 11. Therefore, the CPU 71 makes a "Yes" determination in step 1405, and then proceeds to step 1410. In step 1410, the CPU 71 instructs the unillustrated drive circuit for the electric motor 21 to rotate the motor 21 in the reverse direction with a predetermined electric power. As a result, the electric motor 21 is rotated in the reverse direction with the predetermined electric power, whereby the braking forces of the parking brakes 40L and 40R start to decrease.

Next, the CPU 71 proceeds to step 1415 in order to determine whether the tension Fw of the base wire 31 is greater than the above-described parking-brake-deactivation completion reference value Flow. Since the present point in time is immediately after the reverse rotation of the electric motor 21 has started, the tension Fw of the base wire 31 is greater than the parking-brake-deactivation completion reference value Flow. Therefore, the CPU 71 makes a "Yes" determination in step 1415, and then proceeds directly to step 1495 in order to end the present routine.

After that point in time, the CPU 71 repeatedly executes the processings in steps 1400, 1405 ("Yes" determination), 1410, 1415 ("Yes" determination), and 1495, so long as the tension Fw of the base wire 31, which decreases because of the reverse rotation of the electric motor 21, is greater than the parking-brake-deactivation completion reference value Flow.

When the tension Fw of the base wire 31 reaches the parking-brake-deactivation completion reference value Flow after elapse of a predetermined time, the CPU 71 makes a "No" determination when proceeding to step 1415, and then proceeds to step 1420. In step 1420, the CPU 71 instructs the unillustrated drive circuit for the electric motor 21 to stop the drive of the motor 21. As a result, the electric motor 21 is stopped, and the parking brakes 40L and 40R enter the deactivated state.

Next, the CPU 71 proceeds to step 1425 in order to set the value of the parking brake deactivation control performing flag XOFF to "0," and then proceeds to step 1430 in order to instruct the unillustrated drive circuit for the activation lamp 63 to turn the activation lamp 63 off. Subsequently, the CPU 71 proceeds to step 1495 so as to end the present routine. As a result, the activation lamp 63 is turned off. When the activation lamp 63 is "OFF," this indicates that the parking brakes 40L and 40R are in a deactivated state. After that point in time, the CPU 71 makes a "No" determination when proceeding to step 1405, and then proceeds directly to step 1495 in order to end the present routine. In this manner, the parking brakes 40L and 40R are brought into a deactivated state through performance of the manual deactivation control.

Parking Brake Re-activation Control to be Performed in Response to Release of the Parking Brake:

Next, there will be described the case where parking brake re-activation control is performed in response to release of the parking brake in the state in which the parking brakes 40L and 40R are in an activated state upon completion of the manual activation control. In this case, at the present point in time, the value of the target tension setting flag XRE is "0," the value of the parking brake activation control performing flag XON is "0," and the value of the activation state indicating flag XPARK is "1," because of execution of step 1240 of FIG. 12, step 1325 of FIG. 13, and step 1330 of FIG. 13.

Further, the driver is assumed to operate the brake pedal BP at least at the time of completion of the manual activation control; consequently, the value of the brake-pedal ON flag XBP is "1" at the present point in time because of execution of step 1340 of FIG. 13, and after completion of the manual activation control, the driver is assumed to continue the operation of the brake pedal BP up to the present point in time.

Figure 15:
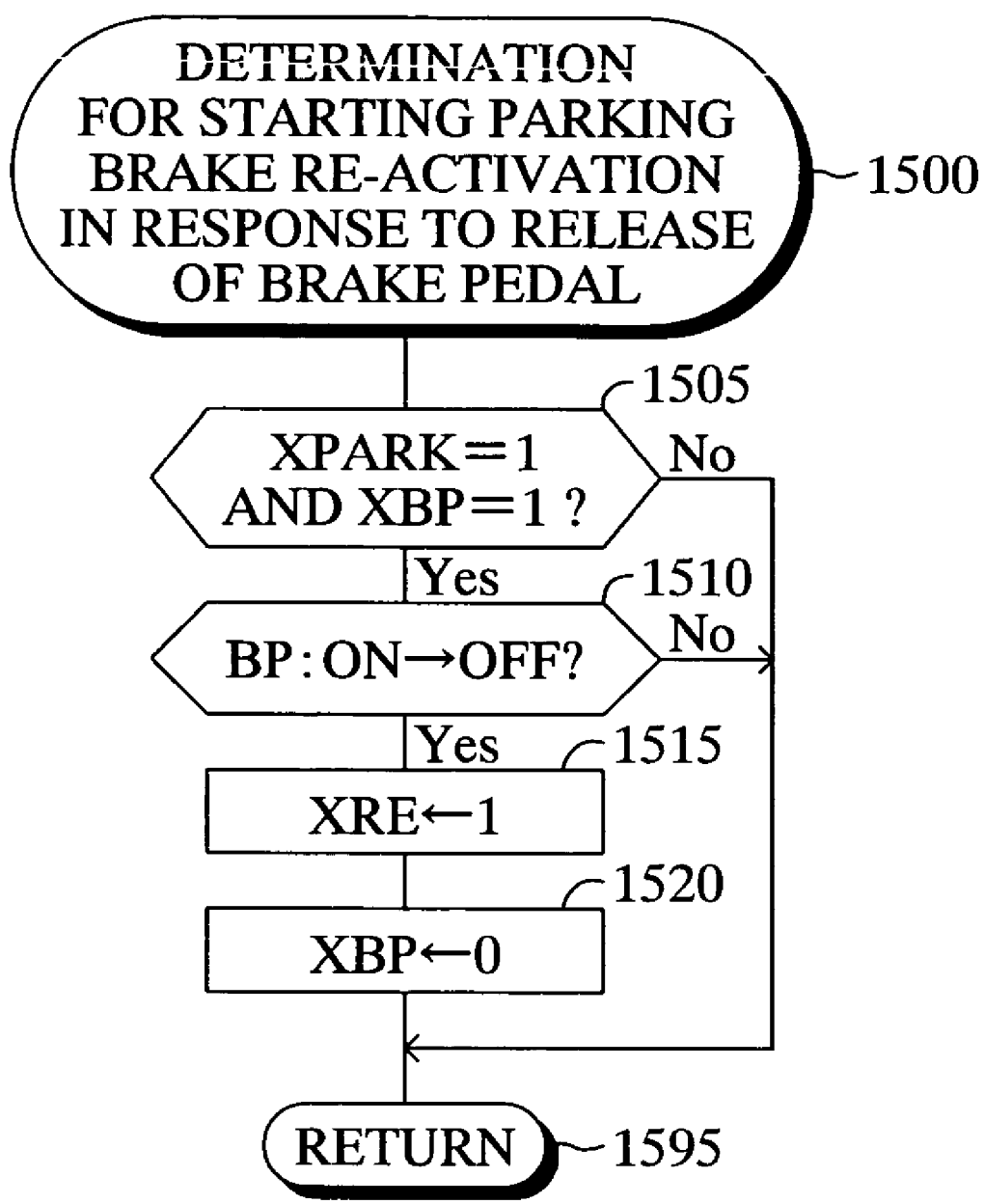
FIG. 15 is a flowchart showing a routine which the CPU shown in FIG. 1 executes in order to determine whether to start parking brake re-activation in response to release of the brake pedal.

At predetermined intervals, the CPU 71 repeatedly performs a routine shown in FIG. 15 and adapted to determine whether parking brake re-activation is to be started in response to release of the parking brake. When a predetermined timing has been reached, the CPU 71 starts the processing from step 1500, and proceeds to step 1505 in order to determine whether the value of the activation state indicating flag XPARK is "1" and the value of the brake-pedal ON flag XBP is "1." When the CPU 71 makes a "No" determination, the CPU 71 proceeds directly to step 1595 in order to end the present routine.

Since at the present point in time both the value of the activation state indicating flag XPARK and the value of the brake-pedal ON flag XBP are "1," the CPU 71 makes a "Yes" determination in step 1505, and then proceeds to step 1510 in order to determine, on the basis of the signal output from the brake pedal sensor 53, whether the parking brake BP has been brought from the operated state to an unoperated state (whether the signal has changed from an "ON" state to an "OFF" state).

As described above, the brake pedal BP is in an operated state at the present point in time, and therefore the CPU 71 makes a "No" determination in step 1510, and then proceeds directly to step 1595 in order to end the present routine. After that point in time, the CPU 71 repeatedly executes the processings in steps 1500, 1505 ("Yes" determination), 1510 ("No" determination), and 1595 until the brake pedal BP is brought into an unoperated state.

The driver is assumed to bring the brake pedal BP from the operated state into an unoperated state at the present point in time. In this case, the CPU 71 makes a "Yes" determination when proceeding to step 1510, and then proceeds to step 1515 in order to set the value of the target tension setting flag XRE to "1." Further, in subsequent step 1520, the CPU 71 sets the value of the brake-pedal ON flag XBP to "0," and then the CPU 71 proceeds to step 1595 in order to end the present routine. After that point in time, because of the value of the brake-pedal ON flag XBP being "0," the CPU 71 makes a "No" determination when proceeding to step 1505, and proceeds directly to step 1595 in order to end the present routine.

Next, the present point in time is assumed to be immediately after the value of the target tension setting flag XRE has been changed from "0" to "1" through performance of the previously described step 1515. In this case, the CPU 71 makes a "Yes" determination when proceeding to step 1105 of FIG. 11, and in step 1110, sets the value of the parking brake activation control performing flag XON to "1." Subsequently, the CPU 71 performs the processings in steps 1115, 1120 ("No" determination), and 1195.

Since the present point in time is immediately after the value of the target tension setting flag XRE has been changed from "0" to "1," the CPU 71 makes a "Yes" determination when proceeding to step 1205 of FIG. 12, and proceeds to step 1210 and to subsequent steps. Specifically, the CPU 71 updates the value of the target tension Fwt in step 1220, makes a "No" determination in subsequent step 1225, and proceeds to step 1240 in order to set the value of the target tension setting flag XRE to "0." Next, the CPU 71 proceeds to step 1295 in order to end the present routine. After that point in time, the CPU 71 makes a "No" determination when proceeding to step 1205, and then proceeds directly to step 1295 in order to end the present routine.

Meanwhile, because the value of the parking brake activation control performing flag XON has been changed from "0" to "1" through performance of the previously described step 1110 of FIG. 11, the CPU 71 makes a "Yes" determination when proceeding to step 1305 of FIG. 13, and then proceeds to step 1310 and to subsequent steps to thereby perform the above-described parking brake activation control. As a result, the tension Fw of the base wire 31 becomes equal to the value of the target tension Fwt updated through performance of the previously described step 1220 of FIG. 12 (or a value greater than the updated value of the target tension Fwt).

After that point in time, because the value of the parking brake activation control performing flag XON has been changed to "0" through performance of step 1325, the CPU 71 makes a "No" determination when proceeding to step 1305, and then proceeds directly to step 1395 so as to end the present routine. In this manner, parking brake re-activation control is performed in response to release of the brake pedal.

Parking Brake Re-activation Control to be Performed in Response to Change in Shift Position:

Next, there will be described the case where parking brake re-activation control is performed in response to a change in the shift position in the state in which the parking brakes 40L and 40R are in an activated state upon completion of the manual activation control. In this case, at the present point in time, the value of the target tension setting flag XRE is "0," the value of the parking brake activation control performing flag XON is "0," and the value of the activation state indicating flag XPARK is "1," because of execution of step 1240 of FIG. 12, step 1325 of FIG. 13, and step 1330 of FIG. 13. Further, the driver is assumed not to have changed the position of the shift lever SL at the present point in time.

Figure 16:
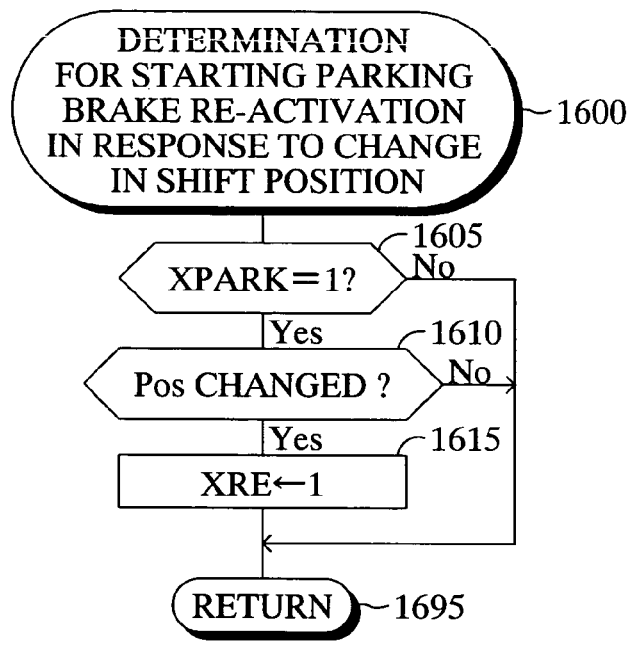
FIG. 16 is a flowchart showing a routine which the CPU shown in FIG. 1 executes in order to determine whether to start parking brake re-activation in response to a change in shift position.

At predetermined intervals, the CPU 71 repeatedly performs a routine shown in FIG. 16 and adapted to determine whether parking brake re-activation is to be started in response to a change in the shift position. When a predetermined timing has been reached, the CPU 71 starts the processing from step 1600, and proceeds to step 1605 in order to determine whether the value of the activation state indicating flag XPARK is "1." When the CPU 71 makes a "No" determination, the CPU 71 proceeds directly to step 1695 in order to end the present routine.

As described above, the value of the activation state indicating flag XPARK is "1" at the present point in time. Therefore, the CPU 71 makes a "Yes" determination in step 1605, and then proceeds to step 1610 in order to determine, on the basis of the signal output from the shift position sensor 55, whether the position Pos of the shift lever SL has changed.

As described above, the position Pos of the shift lever SL has not changed up to the present point in time, and therefore the CPU 71 makes a "No" determination in step 1610, and then proceeds directly to step 1695 in order to end the present routine. After that point in time, the CPU 71 repeatedly executes the processings in steps 1600, 1605 ("Yes" determination), 1610 ("No" determination), and 1695 until the position Pos of the shift lever SL changes.

The driver is assumed to change the position Pos of the shift lever SL at the present point in time. In this case, the CPU 71 makes a "Yes" determination when proceeding to step 1610, and then proceeds to step 1615 in order to set the value of the target tension setting flag XRE to "1." Next, the CPU 71 proceeds to step 1695 in order to end the present routine. After that point in time, every time the position Pos of the shift lever SL changes, the CPU 71 proceeds to step 1615 in order to set the value of the target tension setting flag XRE to "1, so long as the value of the activation state indicating flag XPARK is "1" (when the parking brakes 40L and 40R are in an activated state).

Next, the present point in time is assumed to be immediately after the value of the target tension setting flag XRE has been changed from "0" to "1" through execution of the previously described step 1615. In this case, as in the previously described case where parking brake re-activation control is performed in response to release of the brake pedal, the CPU 71 sets the value of the parking brake activation control performing flag XON to "1" through performance of step 1110 of FIG. 11. Further, during execution of the routine of FIG. 12, the CPU 71 updates the value of the target tension Fwt in step 1220, and then proceeds to step 1240 so as to change the value of the target tension setting flag XRE from "1" to "0."

Meanwhile, because the value of the parking brake activation control performing flag XON has been changed from "0" to "1" through performance of the previously described step 1110 of FIG. 11, the CPU 71 makes a "Yes" determination when proceeding to step 1305 of FIG. 13, and then proceeds to step 1310 and to subsequent steps to thereby perform the above-described parking brake activation control. As a result, the tension Fw of the base wire 31 becomes equal to the value of the target tension Fwt updated through performance of the previously described step 1220 of FIG. 12 (or a value greater than the updated value of the target tension Fwt).

After that point in time, because the value of the parking brake activation control performing flag XON has been changed to "0" through performance of step 1325, the CPU 71 makes a "No" determination when proceeding to step 1305, and then proceeds directly to step 1395. In this manner, parking brake re-activation control is performed in response to a change in the shift position.

Parking Brake Re-activation Control to be Performed in Response to a Change in Vehicle Total Mass:

Next, there will be described the case where parking brake re-activation control is performed in response to a change in the total mass of the vehicle in the state in which the parking brakes 40L and 40R are in an activated state upon completion of the manual activation control. In this case, at the present point in time, the value of the target tension setting flag XRE is "0," the value of the parking brake activation control performing flag XON is "0," and the value of the activation state indicating flag XPARK is "1," because of execution of step 1240 of FIG. 12, step 1325 of FIG. 13, and step 1330 of FIG. 13. Further, because of performance of step 1350 of FIG. 13, the vehicle height Ha detected by the vehicle height sensor 58 at the time of completion of the above-described manual activation control is stored as the reference vehicle height Ho.

Figure 17:
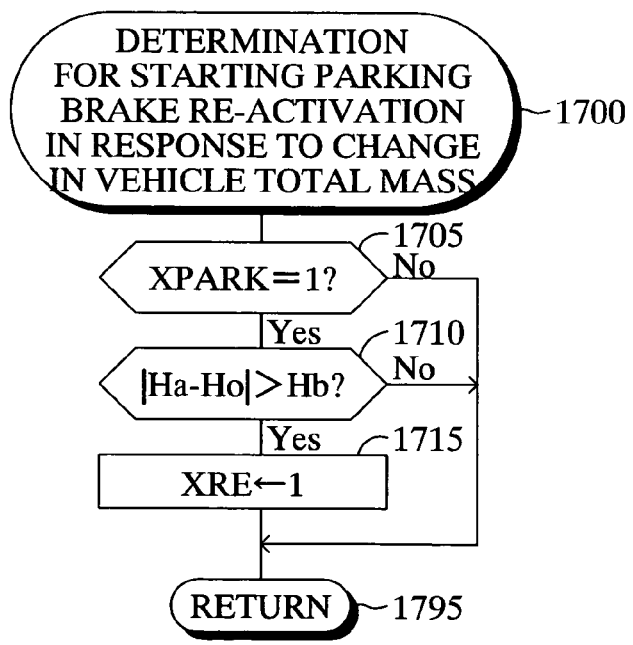
FIG. 17 is a flowchart showing a routine which the CPU shown in FIG. 1 executes in order to determine whether to start parking brake re-activation in response to a change in the total mass of the vehicle.

At predetermined intervals, the CPU 71 repeatedly performs a routine shown in FIG. 17 and adapted to determine whether parking brake re-activation is to be started in response to a change in the total mass of the vehicle. When a predetermined timing has been reached, the CPU 71 starts the processing from step 1700, and proceeds to step 1705 in order to determine whether the value of the activation state indicating flag XPARK is "1." When the CPU 71 makes a "No" determination, the CPU 71 proceeds directly to step 1795 in order to end the present routine.

As described above, the value of the activation state indicating flag XPARK is "1" at the present point in time. Therefore, the CPU 71 makes a "Yes" determination in step 1705, and then proceeds to step 1710 in order to determine whether the absolute value |Ha−Ho| of the difference between the present vehicle height Ha and the reference vehicle height Ho is greater than the above-described threshold value Hb.

Here, the absolute value |Ha−Ho| of the difference is assumed to be equal to or less than the threshold value Hb. In this case, the CPU 71 makes a "No" determination in step 1710, and then proceeds directly to step 1795 in order to end the present routine. After that point in time, the CPU 71 repeatedly executes the processings in steps 1700, 1705 ("Yes" determination), 1710 ("No" determination), and 1795 until the absolute value |Ha−Ho| of the difference becomes greater than the threshold value Hb.

Next, the absolute value |Ha−Ho| of the difference is assumed to have become greater than the threshold value Hb because of, for example, an occupant exiting or entering the vehicle. In this case, the CPU 71 makes a "Yes" determination when proceeding to step 1710, and then proceeds to step 1715 in order to set the value of the target tension setting flag XRE to "1." Subsequently, the CPU 71 proceeds to step 1795 in order to end the present routine. After that point in time as well, the CPU 71 proceeds to step 1715 and sets the value of the target tension setting flag XRE to "1" every time the absolute value |Ha−Ho| of the difference becomes greater than the threshold value Hb, so long as the value of the activation state indicating flag XPARK is "1" (the parking brakes 40L and 40R are in an activated state).

Next, the present point in time is assumed to be immediately after the value of the target tension setting flag XRE has been changed from "0" to "1" through execution of the previously described step 1715. In this case, as in the previously described case where parking brake re-activation control is performed in response to release of the brake pedal, the CPU 71 sets the value of the parking brake activation control performing flag XON to "1" through performance of step 1110 of FIG. 11. Further, during execution of the routine of FIG. 12, the CPU 71 updates the value of the target tension Fwt in step 1220, and then proceeds to step 1240 so as to change the value of the target tension setting flag XRE from "1" to "0."

Meanwhile, because the value of the parking brake activation control performing flag XON has been changed from "0" to "1" through performance of the previously described step 1110 of FIG. 11, the CPU 71 makes a "Yes" determination when proceeding to step 1305 of FIG. 13, and then proceeds to step 1310 and to subsequent steps to thereby perform the above-described parking brake activation control. As a result, the tension Fw of the base wire 31 becomes equal to the value of the target tension Fwt updated through performance of the previously described step 1220 of FIG. 12 (or a value greater than the updated value of the target tension Fwt).

After that point in time, because the value of the parking brake activation control performing flag XON has been changed to "0" through performance of step 1325, the CPU 71 makes a "No" determination when proceeding to step 1305, and then proceeds directly to step 1395 so as to end the present routine. In this manner, parking brake re-activation control is performed in response to a change in vehicle total mass.

Parking Brake Re-activation Control to be Performed in Response to a Drop in Brake Temperature:

Next, there will be described the case where parking brake re-activation control is performed in response to a drop in the brake temperature after completion of the above-described manual activation control. At the time when the manual activation control has ended, the value of the target tension setting flag XRE is "0," the value of the parking brake activation control performing flag XON is "0," and the value of the activation state indicating flag XPARK is "1", because of execution of step 1240 of FIG. 12, and steps 1325 and 1330 of FIG. 13. Further, the time when the manual activation control has ended is immediately after the value of the re-activation time counting flag XTEMP has been changed from "0" to "1" through performance of step 1345 (the value is maintained at "0" through performance of step 1840 of FIG. 18, which will be described later, until the manual activation control ends).

Figure 18:
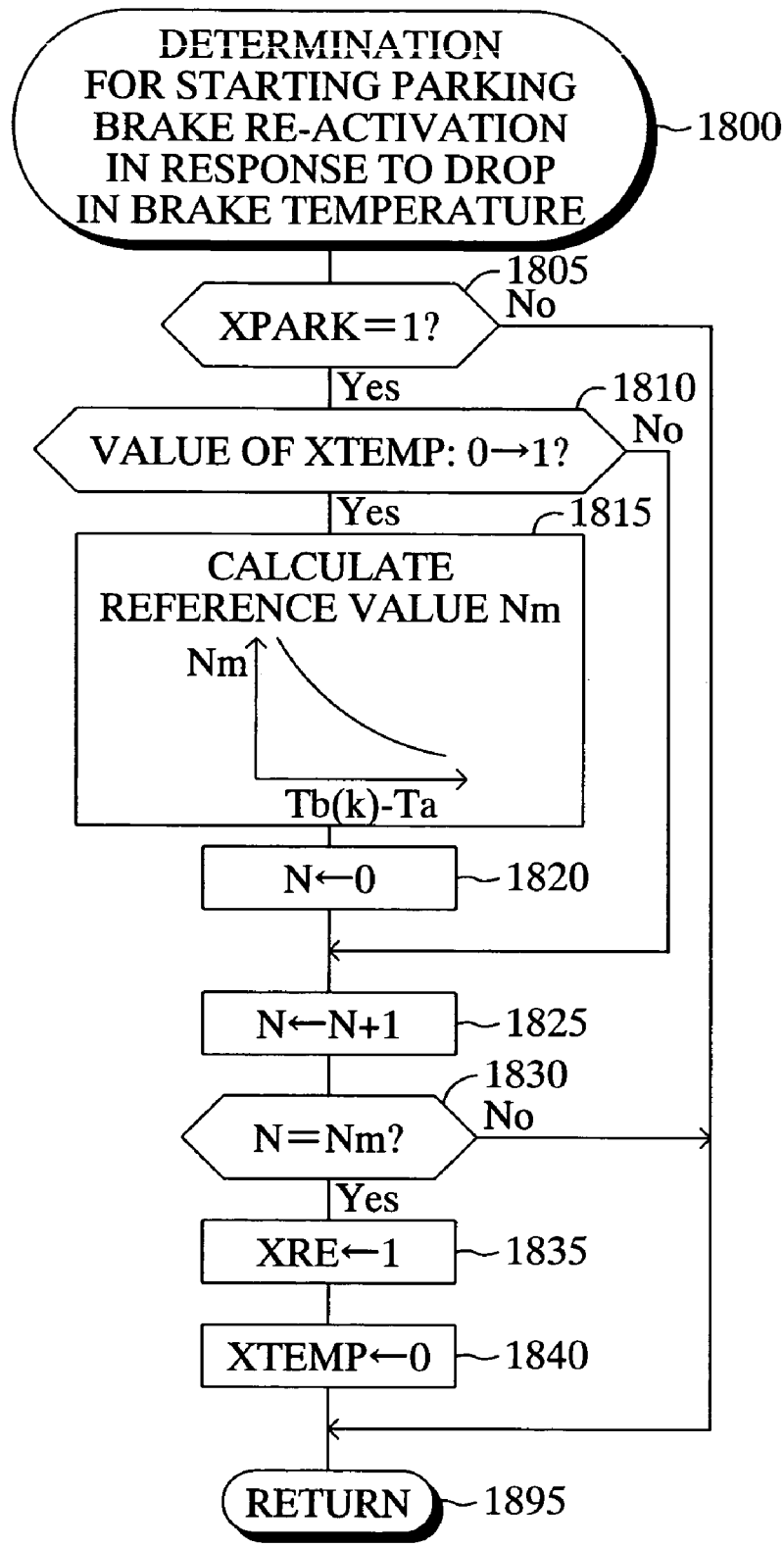
FIG. 18 is a flowchart showing a routine which the CPU shown in FIG. 1 executes in order to determine whether to start parking brake re-activation in response to a drop in brake temperature.

At predetermined intervals, the CPU 71 repeatedly performs a routine shown in FIG. 18 and adapted to determine whether parking brake re-activation is to be started in response to a drop in the brake temperature. When a predetermined timing has been reached, the CPU 71 starts the processing from step 1800, and proceeds to step 1805 in order to determine whether the value of the activation state indicating flag XPARK is "1." When the CPU 71 makes a "No" determination, the CPU 71 proceeds directly to step 1895 in order to end the present routine.

The present point in time is assumed to be immediately after completion of the manual activation control. In this case, as described above, the value of the activation state indicating flag XPARK is "1." Therefore, the CPU 71 makes a "Yes" determination in step 1805, and then proceeds to step 1810 in order to determine whether the value of the re-activation time counting flag XTEMP has been changed from "0" to "1."

Figure 6:
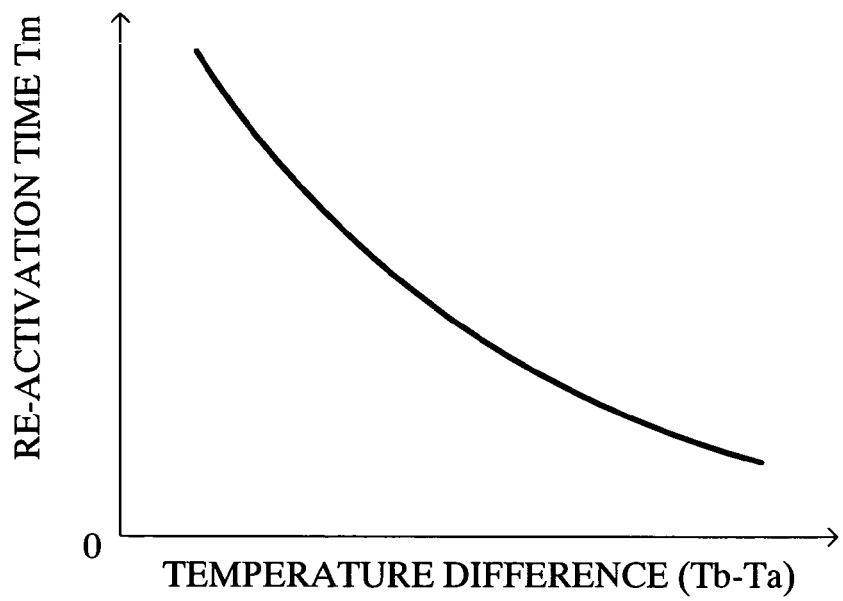
FIG. 6 is a graph showing a table which defines the relation between temperature difference (Tb−Ta) and re-activation time Tm and which the CPU shown in FIG. 1 refers.
Figure 10:
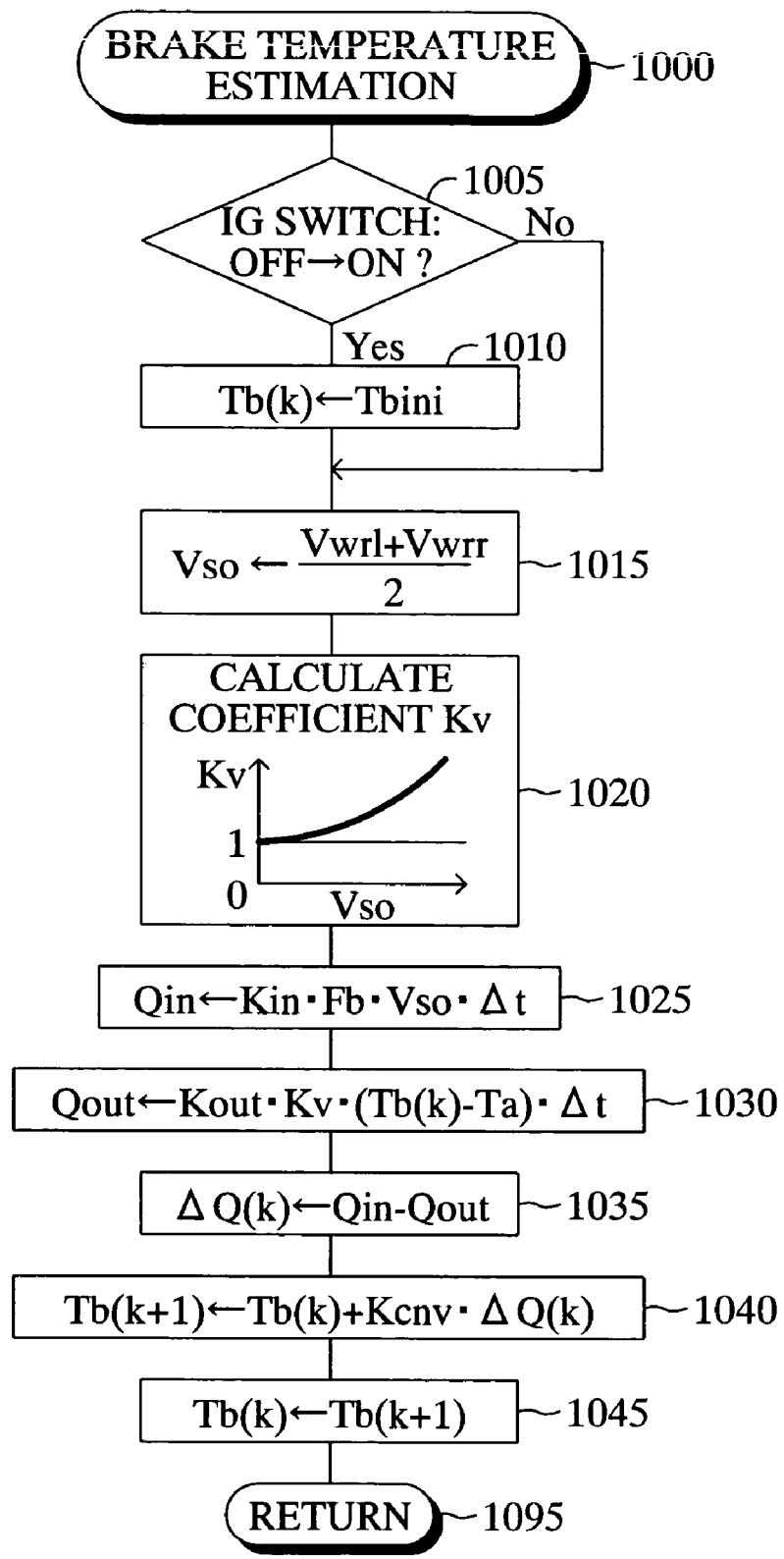
FIG. 10 is a flowchart showing a routine which the CPU shown in FIG. 1 executes in order to estimate brake temperature.

As described above, the present point in time is immediately after the value of the re-activation time counting flag XTEMP has been changed from "0" to "1." Therefore, the CPU 71 makes a "Yes" determination in step 1810, and then proceeds to step 1815 in order to calculate a reference value Nm, which is a natural number corresponding to the above-described re-activation time Tm, on the basis of the temperature Tb(k) of the service brake SBL (or SBR) calculated in step 1045 of FIG. 10 and available at the present point in time, the ambient temperature Ta detected by the ambient temperature sensor 57, and a table illustrated in the block of step 1815, the table corresponding to the table of FIG. 6.

Next, the CPU 71 proceeds to step 1820 in order to set the value of a counter N (hereinafter referred to as "counter value N) to "0," and then proceeds to step 1825 in order to increment the counter value N by one (at the present point in time, the counter value N is "1") to obtain a new counter value N. Subsequently, the CPU 71 proceeds to step 1830 in order to determine whether the counter value N is equal to the reference value Nm.

At the present point in time, the counter value N is "1," and smaller than the reference value Nm. Therefore, the CPU 71 makes a "No" determination in step 1830, and then proceeds directly to step 1895 in order to end the present routine. After that point in time, the CPU 71 repeatedly executes the processings in steps 1800, 1805 ("Yes" determination), 1810 ("No" determination), 1825, 1830 ("No" determination") and 1895 until the counter value N, which increases through repeated execution of the processing in step 1825, becomes equal to the reference value Nm.

When the re-activation time Tm has elapsed after completion of the manual activation control, the counter value N becomes equal to the reference value Nm. As a result, the CPU 71 makes a "Yes" determination when proceeding to step 1830, and then proceeds to step 1835 in order to set the value of the target tension setting flag XRE to "1." Further, the CPU 71 sets the value of the re-activation time counting flag XTEMP to "0" in subsequent step 1840, and then proceeds to step 1895 in order to end the present routine.

After that point in time, since the counter value N, which increases through repeated execution of the processing in step 1825, is greater than the reference value Nm, the CPU 71 repeatedly executes the processings in steps 1800, 1805 ("Yes" determination), 1810 ("No" determination), 1825, 1830 ("No" determination") and 1895 until the value of the re-activation time counting flag XTEMP is again changed from "0" to "1."

Next, the present point in time is assumed to be immediately after the value of the target tension setting flag XRE has been changed from "0" to "1" through execution of the previously described step 1835. In this case, as in the previously described case where parking brake re-activation control is performed in response to release of the brake pedal, the CPU 71 sets the value of the parking brake activation control performing flag XON to "1" through performance of step 1110 of FIG. 11. Further, during execution of the routine of FIG. 12, the CPU 71 updates the value of the target tension Fwt in step 1220, and then proceeds to step 1240 so as to change the value of the target tension setting flag XRE from "1" to "0."

Further, because the value of the parking brake activation control performing flag XON has been changed from "0" to "1" through performance of the previously described step 1110 of FIG. 11, the CPU 71 makes a "Yes" determination when proceeding to step 1305 of FIG. 13, and then proceeds to step 1310 and to subsequent steps to thereby perform the above-described parking brake activation control. As a result, the tension Fw of the base wire 31 becomes equal to the value of the target tension Fwt updated through performance of the previously described step 1220 of FIG. 12 (or a value greater than the updated value of the target tension Fwt). Moreover, the value of the re-activation time counting flag XTEMP is again changed from "0" to "1" through execution of step 1345.

After that point in time, since the value of the parking brake activation control performing flag XON has been changed to "0" through performance of step 1325, the CPU 71 makes a "No" determination when proceeding to step 1305, and then proceeds directly to step 1395 so as to end the present routine.

Next, the present point in time is assumed to be immediately after the value of the re-activation time counting flag XTEMP has been changed from "0" to "1" through execution of step 1345. In this case, the CPU 71 makes a "Yes" determination when proceeding to step 1810 of FIG. 18, and then proceeds to step 1815 in order to calculate a reference value Nm, which corresponds to a new re-activation time Tm, on the basis of the ambient temperature Ta and the temperature Tb(k) of the service brake SBL (or SBR) calculated in step 1045 of FIG. 10 and available at the present point in time. When the new re-activation time Tm has elapsed, the CPU 71 makes a "Yes" determination in step 1830, and then proceeds to step 1835 in order to again change the value of the target tension setting flag XRE from "0" to "1." Further, the CPU 71 changes the re-activation time counting flag XTEMP from "1" to "0" in subsequent step 1840.

As a result, the value of the target tension Fwt is again updated in step 1220 of FIG. 12, and through performance of the above-described parking brake activation control, the tension Fw of the base wire 31 becomes equal to the updated value of the target tension Fwt (or a value greater than the updated value of the target tension Fwt). Moreover, the value of the re-activation time counting flag XTEMP is again changed from "0" to "1" through execution of step 1345. In this manner, every time parking brake re-activation control started in response to a drop in brake temperature ends, a new re-activation time Tm for the next re-activation is set, and when the set re-activation time Tm has elapsed, the parking brake activation control is performed again.

Parking Brake Re-activation Control to be Performed in Response to Turn-off of the Ignition Switch:

Next, there will be described the case where parking brake re-activation control is performed in response to a turn off operation of the ignition switch in the state in which the parking brakes 40L and 40R are in an activated state upon completion of the manual activation control. In this case, at the present point in time, the value of the target tension setting flag XRE is "0," the value of the parking brake activation control performing flag XON is "0," and the value of the activation state indicating flag XPARK is "1," because of execution of step 1240 of FIG. 12, step 1325 of FIG. 13, and step 1330 of FIG. 13.

Figure 19:
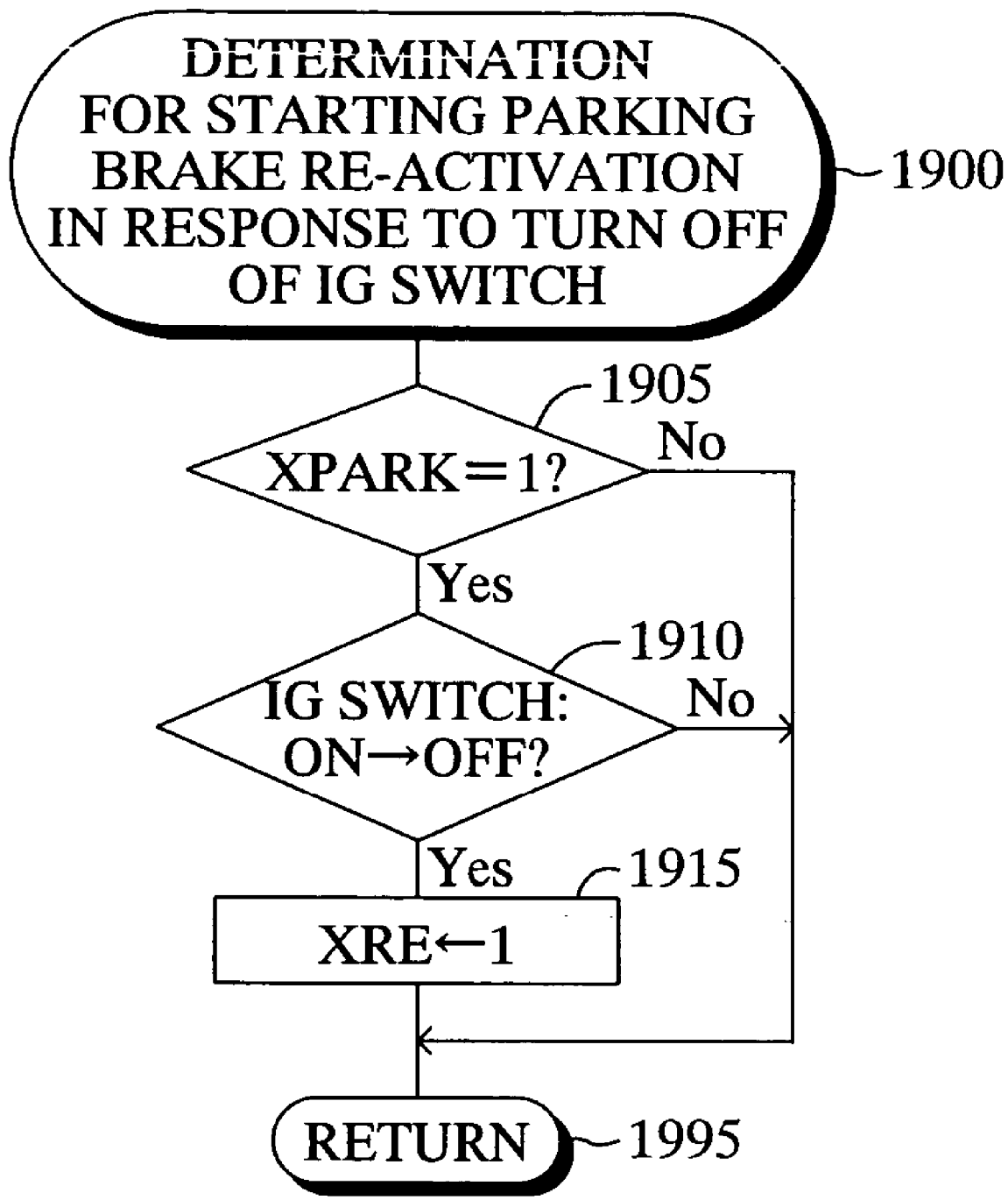
FIG. 19 is a flowchart showing a routine which the CPU shown in FIG. 1 executes in order to determine whether to start parking brake re-activation in response to a turning-off of an ignitions switch.

At predetermined intervals, the CPU 71 repeatedly performs a routine shown in FIG. 19 and adapted to determine whether parking brake re-activation is to be started in response to a turn off operation of the ignition switch. When a predetermined timing has been reached, the CPU 71 starts the processing from step 1900, and proceeds to step 1905 in order to determine whether the value of the activation state indicating flag XPARK is "1." When the CPU 71 makes a "No" determination, the CPU 71 proceeds directly to step 1995 in order to end the present routine.

As described above, the value of the activation state indicating flag XPARK is "1" at the present point in time. Therefore, the CPU 71 makes a "Yes" determination in step 1905, and then proceeds to step 1910 in order to determine whether the ignition switch has been turned off. When the CPU 71 makes a "No" determination in step 1910, the CPU 71 proceeds directly to step 1995 in order to end the present routine. After that point in time, the CPU 71 repeatedly executes the processings in steps 1900, 1905 ("Yes" determination), 1910 ("No" determination), and 1995 until the ignition switch is turned off.

The driver is assumed to turn the ignition switch off. In this case, the CPU 71 makes a "Yes" determination when proceeding to step 1910, and then proceeds to step 1915 in order to change the value of the target tension setting flag XRE from "0" to "1." Subsequently, the CPU 71 proceeds to step 1995 in order to end the present routine.

Next, the present point in time is assumed to be immediately after the value of the target tension setting flag XRE has been changed from "0" to "1" through execution of the previously described step 1915. In this case, as in the previously described case where parking brake re-activation control is performed in response to release of the brake pedal, the CPU 71 sets the value of the parking brake activation control performing flag XON to "1" through performance of step 1110 of FIG. 11. Further, during execution of the routine of FIG. 12, the CPU 71 updates the value of the target tension Fwt in step 1220, and then proceeds to step 1240 so as to change the value of the target tension setting flag XRE from "1" to "0."

Since the present point in time is immediately after the ignition switch has been turned off, the CPU 71 makes a "Yes" determination when proceeding to step 1225 after having updated the value of the target tension Fwt in step 1220 of FIG. 12, and then proceeds to step 1230. In step 1230, the CPU 71 calculates an increase amount Fwup on the basis of the ambient temperature Ta, the temperature Tb(k) of the service brake SBL (or SBR) calculated in step 1045 of FIG. 10 and available at the present point in time, and a table illustrated in the block of step 1230, the table being similar to that of FIG. 9.

Subsequently, the CPU 71 proceeds to step 1235 in order to store, as a new target tension Fwt, a value obtained by adding the increase amount Fwup to the value of the target tension Fwt updated in step 1220. Subsequently, the CPU 71 proceeds to step 1295 via step 1240 so as to end the present routine.

Further, because the value of the parking brake activation control performing flag XON has been changed from "0" to "1" through performance of the previously described step 1110 of FIG. 11, the CPU 71 makes a "Yes" determination when proceeding to step 1305 of FIG. 13, and then proceeds to step 1310 and to subsequent steps to thereby perform the above-described parking brake activation control.

As a result, the tension Fw of the base wire 31 becomes equal to the value of the target tension Fwt updated with the increase amount Fwup through performance of the previously described step 1220 of FIG. 12 (or a value greater than the updated value of the target tension Fwt). Next, the parking brake control unit 70 stops the operation, because supply of electric power is stopped.

As described above, in the electric parking brake apparatus according to the present invention, when the driver operates the activation switch 61 for a short period of time, parking brake activation control is performed in order to operate the electric motor 21 until the tension Fw of the base wire 31 reaches the predetermined target tension Fwt, to thereby bring the parking brakes 40L and 40R in an activated state. Subsequently, the parking brake activation control is again performed when a re-activation time Tm, which is set in accordance with the difference (Tb(k)−Ta) between the temperature Tb(k) of the service brake SBL (or SBR) and the ambient temperature Ta, has elapsed; when the position POs of the shift lever SL has been changed by the driver; when the absolute value |Ha−Ho| of the difference between the present vehicle height Ha and the reference vehicle height Ho has become greater than the threshold value Hb; when the driver releases the brake pedal BP which has been continuously operated after completion of the parking brake activation control; or when the ignition switch is turned off. As a result, even after the parking brakes 40L and 40R have entered an activated state, the braking force of the parking brakes 40L and 40R is secured properly, and therefore, the vehicle can be reliably stopped and maintained in the stopped state.

The present invention is not limited to the above-described embodiment and may be practiced in various modified forms without departing from the scope of the invention. For example, in the above-described embodiment, the electric parking brake apparatus is configured in such a manner that the temperature of the parking brakes 40L, 40R is assumed to be identical to that of the service brake SBL (or SBR), and the above-described parking brake re-activation control to be performed in response to a drop in brake temperature is performed upon elapse of time corresponding the degree of a drop in the temperature of the service brake SBL (or SBR) estimated periodically. However, the electric parking brake apparatus may be configured to estimate the temperature of the parking brakes 40L, 40R or to directly detect the same by use of a temperature sensor or the like, and to perform the parking brake re-activation control upon elapse of time corresponding the degree of a drop in the estimated or detected temperature of the parking brakes 40L, 40R.

In the above-described embodiment, the electric parking brake apparatus is configured in such a manner that the parking brake re-activation control to be performed in response to a drop in the brake temperature is always performed even when the difference (Tb−Ta) between the temperature Tb of the service brake SBL (or SBR) and the ambient temperature Ta is small. However, the electric parking brake apparatus may be configured in such a manner that the parking brake re-activation control is not performed when the difference (Tb−Ta) between the temperature Tb of the service brake SBL (or SBR) and the ambient temperature Ta is smaller than a predetermined reference value.

In the above-described embodiment, the electric parking brake apparatus is configured in such a manner that the parking brake re-activation control to be performed in response to release of the brake pedal is performed when the brake pedal BP is operated at least at the time of completion of the parking brake activation control. However, the electric parking brake apparatus may be configured in such a manner that the parking brake re-activation control is performed only when the brake pedal BP is operated continuously over a period from the start of the parking brake activation control to the end of the parking brake activation control.

In the above-described embodiment, the tension Fw of the base wire 31 is used as a pressure-contact-force-related quantity. However, an ammeter may be provided so as to detect current flowing through the electric motor 21, and the current flowing through the electric motor 21 may be used as a pressure-contact-force-related quantity.

In the above-described embodiment, brake pedal operation force Fb is used for calculation of heat accumulation quantity Qin. However, a hydraulic pressure sensor may be provided so as to detect a brake hydraulic pressure generated by the brake hydraulic pressure generation device HD, and the detected brake hydraulic pressure used instead of the brake pedal operation force Fb for calculation of heat accumulation quantity Qin. In the above-described embodiment, an acceleration sensor may be provided in order to detect an acceleration Gx in the front-rear direction of the vehicle, and for calculation of heat accumulation quantity Qin, there may be used a predetermined function value which is obtained while the acceleration Gx and inclination angle θ are used, as arguments, in place of the brake pedal operation force Fb.

In the above-described embodiment, after completion of the parking brake activation control, the parking brake activation control may be again performed upon passage of a time corresponding to a degree of change in the engine rotation speed Ne (e.g., when the engine rotation speed Ne changes by a predetermined amount or more within a predetermined period of time) in a state in which the shift lever SL is located at a position other than the P position or the N position (i.e., a position at which the vehicle is driven to move forward or backward).

What is claimed is:

1. An electric parking brake apparatus operable independently of fluid pressure, comprising:

a parking brake of a type which does not utilize fluid pressure for generating parking brake force, including a rotation member rotating together with a wheel of a vehicle, and a friction member generating a braking force corresponding to a pressure contact force with which the friction member is pressed against the rotation member;

electric drive means for driving the friction member;

control means for performing parking brake activation control in order to operate the electric drive means until a pressure-contact-force-related quantity, which changes in accordance with the pressure contact force of the friction member, reaches a predetermined target pressure-contact-force-related quantity, to thereby bring the parking brake into an activated state so as to stop the vehicle and maintain the vehicle in a stopped state, and subsequently stop the operation of the electric drive means;

a force transmission blocking mechanism interposed between the electric drive means and the parking brake, the force transmission blocking mechanism permitting transmission of drive torque of the electric drive means to the friction member, but blocking transmission, to the electric drive means, of a force generated stemming from the pressure contact force of the friction member; and shift position detection means for detecting a position of a shift lever of the vehicle;

wherein when the position of the shift lever is changed in a state in which the parking brake is in the activated state upon completion of the parking brake activation control, the control means again performs the parking brake activation control.

2. An electric parking brake apparatus according to claim 1, further comprising service brake state determination means for determining whether a service brake of the vehicle is generating a braking force, wherein when the parking brake activation control ends in a state in which the service brake is generating a braking force and then the service brake stops generation of the braking force, the control means again performs the parking brake activation control.

3. An electric parking brake apparatus according to claim 1, further comprising a vehicle total mass change detection means for detecting a change in a total mass of the vehicle, wherein when a change in the total mass of the vehicle is detected after completion of the parking brake activation control, the control means again performs the parking brake activation control.

4. An electric parking brake apparatus according to claim 2, further comprising vehicle total mass change detection means for detecting a change in a total mass of the vehicle, wherein when a change in the total mass of the vehicle is detected after completion of the parking brake activation control, the control means again performs the parking brake activation control.

* * * * *